(12) United States Patent
Tanaka

(10) Patent No.: US 10,264,443 B2
(45) Date of Patent: Apr. 16, 2019

(54) COMMUNICATIONS SYSTEM, COMMUNICATIONS METHOD, COMMUNICATIONS APPARATUS, AND MOBILE TERMINAL

(71) Applicant: FUJITSU CONNECTED TECHNOLOGIES LIMITED, Kawasaki-shi, Kanagawa (JP)

(72) Inventor: Yoshinori Tanaka, Yokohama (JP)

(73) Assignee: FUJITSU CONNECTED TECHNOLOGIES LIMITED, Kawasaki (JP)

(*) Notice: Subject to any disclaimer, the term of this patent is extended or adjusted under 35 U.S.C. 154(b) by 102 days.

(21) Appl. No.: 15/403,550

(22) Filed: Jan. 11, 2017

(65) Prior Publication Data

US 2017/0127267 A1 May 4, 2017

Related U.S. Application Data

(63) Continuation of application No. PCT/JP2014/070784, filed on Aug. 6, 2014.

(51) Int. Cl.
*H04W 8/22* (2009.01)
*H04W 76/00* (2018.01)
(Continued)

(52) U.S. Cl.
CPC .............. *H04W 8/22* (2013.01); *H04W 8/005* (2013.01); *H04W 76/14* (2018.02); *H04W 92/18* (2013.01); *H04W 88/02* (2013.01); *H04W 88/08* (2013.01)

(58) Field of Classification Search
CPC ....... H04W 76/14; H04W 8/005; H04W 8/22; H04W 92/18; H04W 88/08; H04W 76/023; H04W 88/02; H04W 76/23
See application file for complete search history.

(56) References Cited

U.S. PATENT DOCUMENTS 9,380,623 B2* 6/2016 Kim .................... H04W 40/246
9,654,960 B2* 5/2017 Zhou ..................... H04W 76/14
(Continued)

FOREIGN PATENT DOCUMENTS

| JP | 2013-507029 A | 2/2013 |
| JP | 2013-526157 A | 6/2013 |
| WO | 2014/069221 A1 | 5/2014 |

OTHER PUBLICATIONS

3GPP TS 23.682 V11.0.0, "3rd Generation Partnership Project; Technical Specification Group Services and System Aspects; Architecture enhancements to facilitate communications with packet data networks and applications (Release 11)", Mar. 2012.
(Continued)

*Primary Examiner* — Ahmed Elallam
(74) *Attorney, Agent, or Firm* — Myers Solin, LLC

(57) ABSTRACT

A communications system includes a first mobile terminal; a second mobile terminal that includes one or more mobile terminals in a state of being unable to directly communicate with the first mobile terminal and that transmits to a network, via a base station, service information indicating communications services that the second mobile terminal is able to provide in inter-terminal communication; and a communications apparatus that is provided on the network and that transmits to the first mobile terminal, information related to a communications service that the first mobile terminal is able to use, among the communications services indicated by the service information transmitted by the second mobile terminal.

12 Claims, 26 Drawing Sheets

(51) Int. Cl.
*H04W 76/14* (2018.01)
*H04W 92/18* (2009.01)
*H04W 8/00* (2009.01)
*H04W 88/02* (2009.01)
*H04W 88/08* (2009.01)

(56) References Cited

U.S. PATENT DOCUMENTS

| | | |
|---|---|---|
| 2011/0082939 A1 | 4/2011 | Montemurro et al. |
| 2011/0258313 A1 | 10/2011 | Mallik et al. |
| 2013/0288668 A1 | 10/2013 | Pragada et al. |
| 2014/0162644 A1 | 6/2014 | Ou |
| 2014/0204847 A1* | 7/2014 | Belleschi ............ H04W 76/023 370/329 |
| 2014/0204898 A1* | 7/2014 | Yang ..................... H04W 8/005 370/330 |
| 2015/0257186 A1 | 9/2015 | Fukuta |
| 2016/0037385 A1* | 2/2016 | Boudreau ............. H04W 76/14 370/328 |
| 2016/0278069 A1* | 9/2016 | Lee ....................... H04W 48/08 |
| 2017/0215084 A1* | 7/2017 | Futaki .................. H04W 16/14 |

OTHER PUBLICATIONS

3GPP TR 23.703 V12.0.0, "3rd Generation Partnership Project; Technical Specification Group Services and System Aspects; Study on architecture enhancements to support Proximity-based Services (ProSe) (Release 12)", Feb. 2014.
International Search Report issued for corresponding International Patent Application No. PCT/JP2014/070784 dated Nov. 4, 2014.
International Preliminary Report on Patentability for corresponding International Patent Application No. PCT/JP2014/070784 dated Nov. 4, 2014, with partial English translation.
Partial supplementary European search report issued by the European Patent Office for corresponding European Patent Application No. 14899402.3, dated Jun. 29, 2017.
Extended European search report with supplementary European search report and the European search opinion issued by the European Patent Office for corresponding European Patent Application No. 14899402.3, dated Oct. 5, 2017.
Notification of Reasons for Refusal issued by the Japan Patent Office for corresponding Japanese Patent Application No. 2016-539744, dated Jan. 23, 2018, with an English translation.
Isomura et al., "Proposal of Integration Method for Service Discovery Protocols", IEICE Technical Report, vol. 101, No. 186, pp. 51-58, Jul. 10, 2001, with English abstract.
Notice of Preliminary Rejection issued by the Korean Intellectual Property Office for corresponding Korean Patent Application No. 10-2017-7001687, dated Aug. 7, 2017, with English translation.
Notice of Final Rejection issued by the Korean Intellectual Property Office for corresponding Korean Patent Application No. 10-2017-7001687, dated Mar. 28, 2018, with English translation.

* cited by examiner

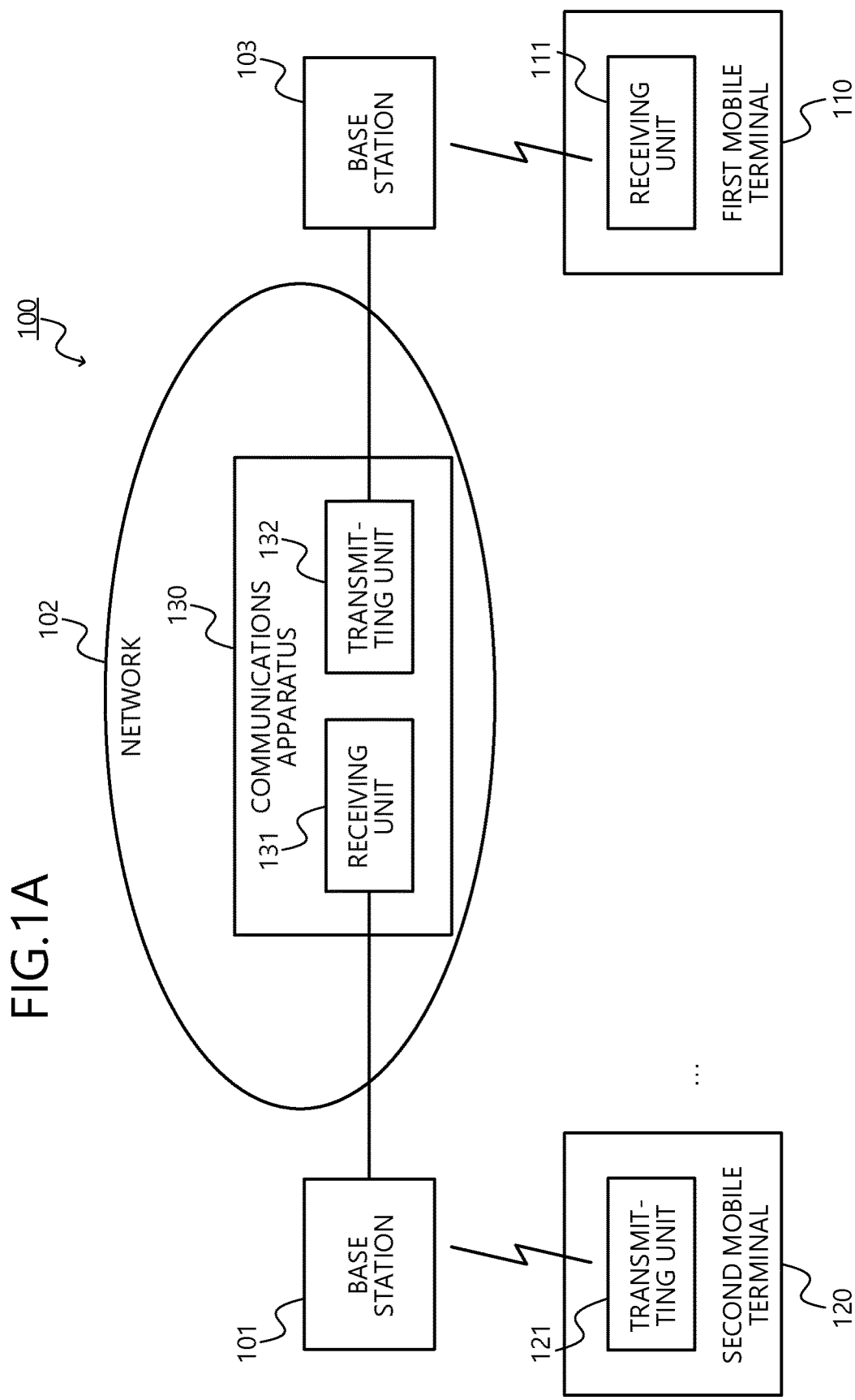

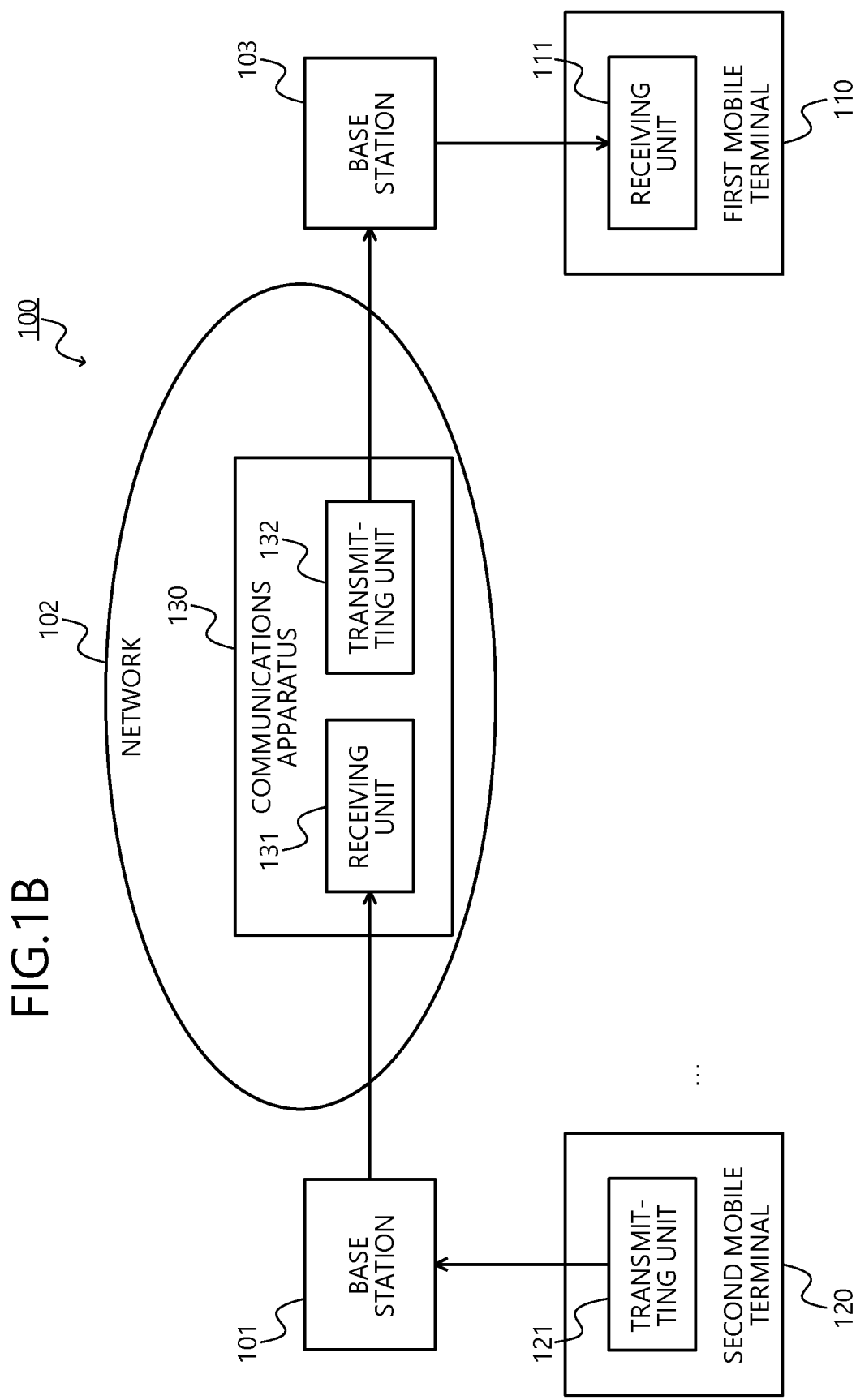

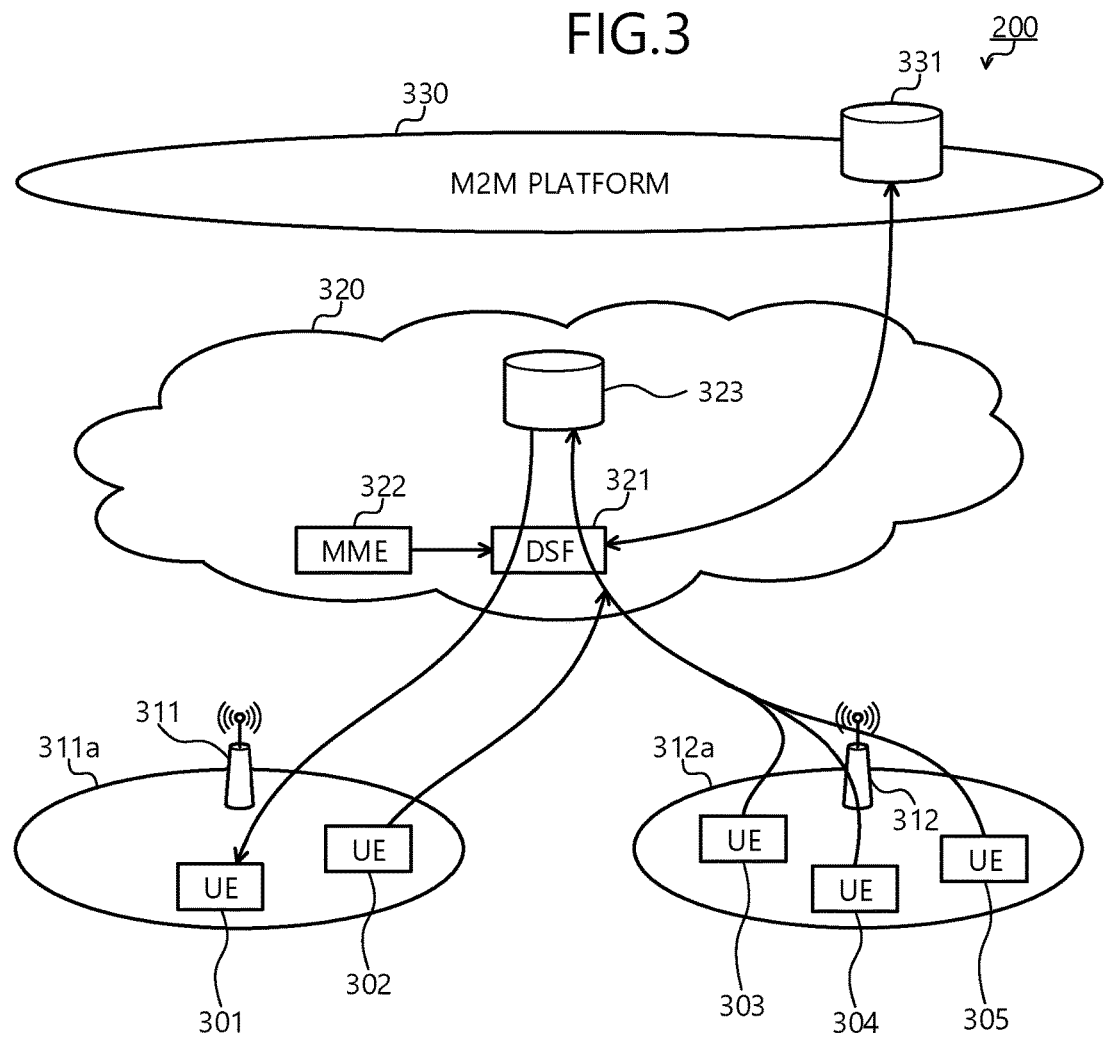

FIG.6B

| Field | Assessed Length | Purpose |
|---|---|---|
| Source L2 ID/Prose UE ID of source | e.g. 48 bits? | To identify a single UE source of the information in the message. This can be used for subsequent communication or to send a reply in Model B of operation |
| Destination L2 ID | e.g. 48 bits? | To identify a single UE or group of UEs that are intended recipients of the information (a single UE in responses for model B). |
| Message type | 8 bits | Type of discovery message |
| Prose Application ID | 64 bits | Needed to perform matching to the required service Set/Discovery criterion |
| UE mode of operation | 2 bits | Defines whether a Public safety ProSe UE is acting as a UE-to-network relay, UE-to-UE or both or not acting as relay |
| PLMN ID | 24 bits | The PLMN ID the ProSe UE is attached to. |
| Status bits | 4 bits | Some status/maintenance flags. |

| APPLICATION | SERVICE NUMBER |
|---|---|
| COMPETITIVE GAME | e, g |
| REMOTE CONTROL | a, b, d |
| P2P FILE TRANSFER | c, f |
| CLOUD M2M | h |

FIG.12

| DEVICE/SERVER | SERVICE | REQUIRED QoS (ALLOWABLE AMOUNT OF DELAY) | D2D DISCOVERY RESULT | PLMN ID |
|---|---|---|---|---|
| DEVICE A | a | 12 [ms] | B | 1 |
| DEVICE B | b | 20 [ms] | A | 1 |
| DEVICE C | c | 180 [ms] | B, D | 1 |
| DEVICE D | d | 40 [ms] | C | 1 |
| DEVICE E | e | 5 [ms] | F | 2 |
| DEVICE F | f | 120 [ms] | E, G | 2 |
| DEVICE G | g | 5 [ms] | F | 2 |
| SERVER H | h | 300 [ms] | - | - |

1200

| USABLE SERVICE | APPLICABLE-LINK LIMITATION |
|---|---|
| b | D2D, eICBD |
| c | OTHER THAN VIA INTERNET, D2D |
| d | eICBD |
| f | INTER-OPERATOR COMMUNICATION |
| h | VIA INTERNET |

FIG.18

| DEVICE | SERVICE | ALLOW-ABLE AMOUNT OF DELAY | D2D DISCOVERY RESULT | PLMN ID | PRESENTED CANDIDATE SERVICE | | | | | | | |
|---|---|---|---|---|---|---|---|---|---|---|---|---|
| | | | | | a | b | c | d | e | f | g | h |
| A | a | 12 [ms] | B | 1 | - | D2D, eICBD | OTHER THAN VIA INTERNET, D2D | eICBD | × | INTER-OPERATOR COMMUNICATION | × | VIA INTERNET |
| B | b | 20 [ms] | A | 1 | D2D, eICBD | - | OTHER THAN VIA INTERNET, D2D | eICBD | × | INTER-OPERATOR COMMUNICATION | × | VIA INTERNET |
| C | c | 180 [ms] | B, D | 1 | eICBD | D2D, eICBD | - | D2D, eICBD | × | INTER-OPERATOR COMMUNICATION | × | VIA INTERNET |
| D | d | 40 [ms] | C | 1 | eICBD | eICBD | OTHER THAN VIA INTERNET | - | × | INTER-OPERATOR COMMUNICATION | × | VIA INTERNET |
| E | e | 5 [ms] | F | 2 | × | × | INTER-OPERATOR COMMUNICATION | × | - | OTHER THAN VIA INTERNET | × | VIA INTERNET |
| F | f | 120 [ms] | E, G | 2 | × | × | INTER-OPERATOR COMMUNICATION | × | D2D | - | D2D | VIA INTERNET |
| G | g | 5 [ms] | F | 2 | × | × | INTER-OPERATOR COMMUNICATION | × | × | OTHER THAN VIA INTERNET | - | VIA INTERNET |

1800

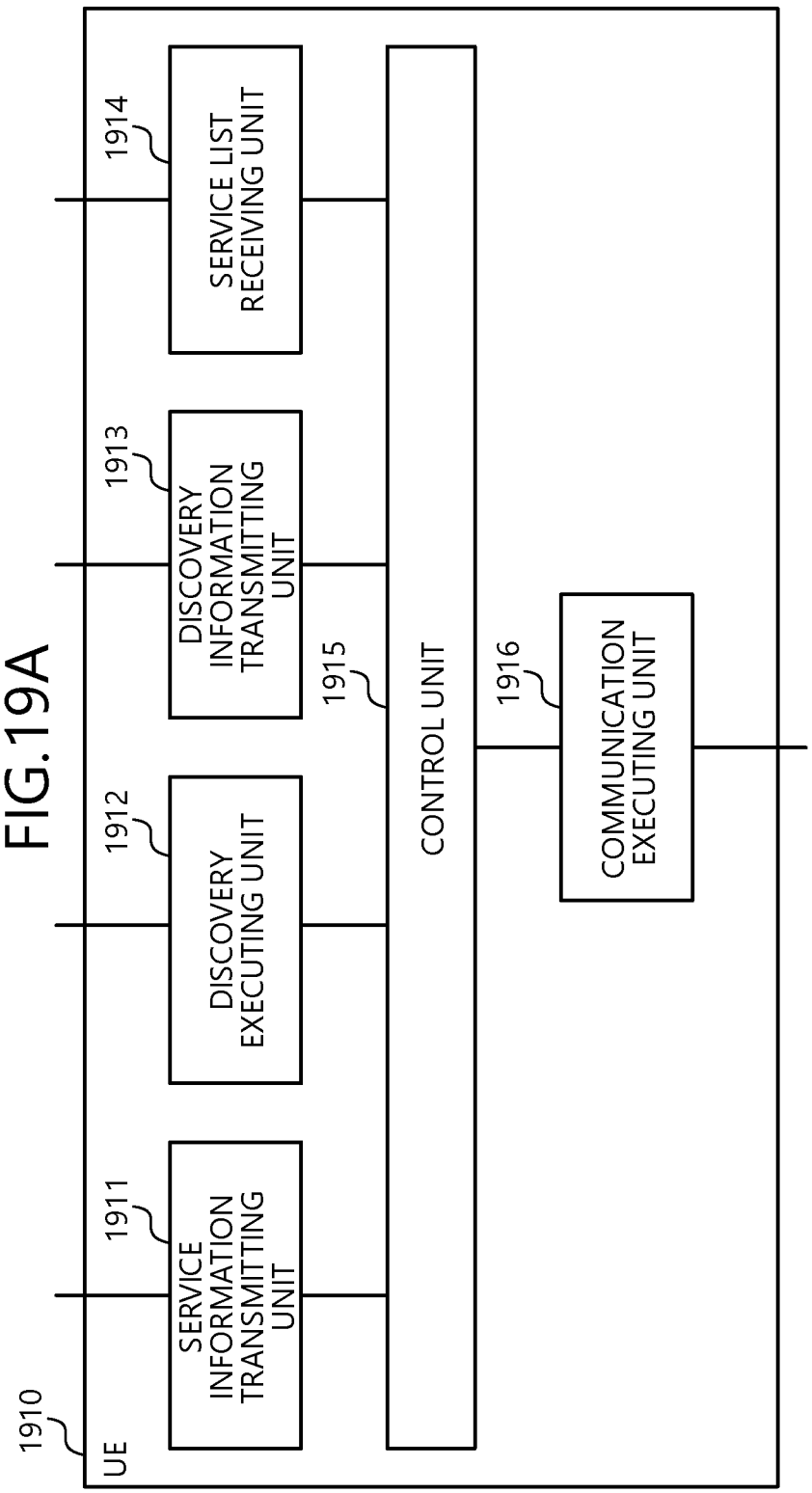

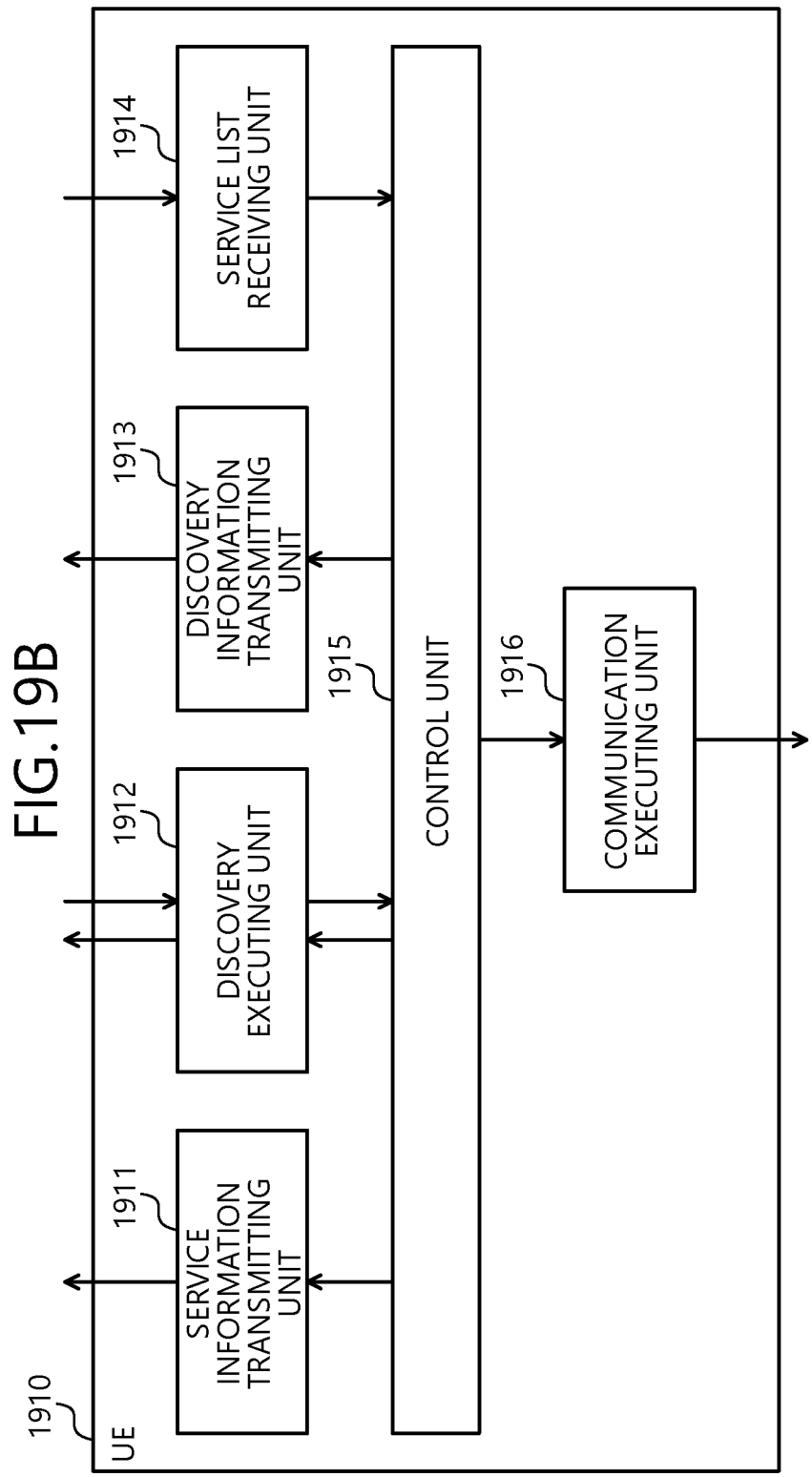

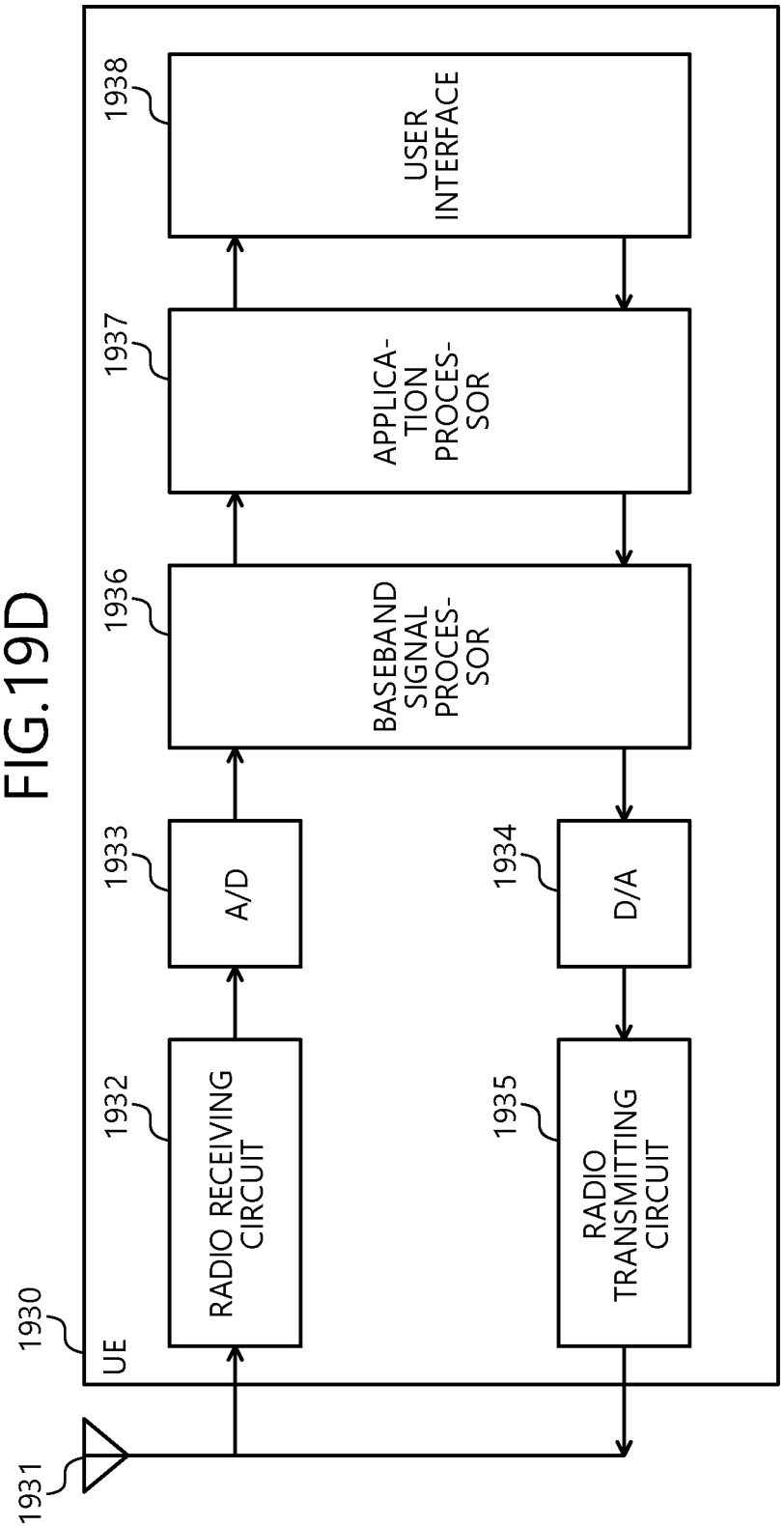

COMMUNICATIONS SYSTEM, COMMUNICATIONS METHOD, COMMUNICATIONS APPARATUS, AND MOBILE TERMINAL

CROSS REFERENCE TO RELATED APPLICATIONS

This application is a continuation application of International Application PCT/JP2014/070784, filed on Aug. 6, 2014, and designating the U.S., the entire contents of which are incorporated herein by reference.

FIELD

The embodiments discussed herein relate to a communications system, a communications method, communications apparatus, and a mobile terminal.

BACKGROUND

Long Term Evolution (LTE) and LTE-Advanced wireless communications systems are commonly known. Proximity-based services (ProSe) that perform direct communication between nearby terminals are also being studied (for example, refer to "Study on architecture enhancements to support Proximity-based Services (ProSe)", 3GPP TR 23.703, Release 12, year: 2014). Studies related to group management functions of machine type communication (MTC) devices and communication between MTC devices are also being performed (for example, refer to "Architecture enhancements to facilitate communications with packet data networks and applications", 3GPP TS 23.682, Release 11, year: 2012).

SUMMARY

According to an aspect of an embodiment, a communications system includes a first mobile terminal; a second mobile terminal that includes one or more mobile terminals in a state of being unable to directly communicate with the first mobile terminal and that transmits to a network, via a base station, service information indicating communications services that the second mobile terminal is able to provide in inter-terminal communication; and a communications apparatus that is provided on the network and that transmits to the first mobile terminal, information related to a communications service that the first mobile terminal is able to use, among the communications services indicated by the service information transmitted by the second mobile terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram depicting an example of a communications system according to a first embodiment;

FIG. 1B is a diagram depicting an example of signal flow in the communications system depicted in FIG. 1A;

FIG. 3 is a diagram depicting an example of a communications system provided with a DSF;

FIG. 6B is a diagram depicting an example of a discovery message;

FIG. 10 is a diagram depicting an example of services corresponding to devices and servers;

FIG. 12 is a diagram depicting an example of information collected by a DSF;

FIG. 18 is a diagram depicting an example of filtering results for each device;

FIG. 19A is a diagram depicting an example of a UE;

FIG. 19B is a diagram depicting an example of signal flow in the UE depicted in FIG. 19A;

FIG. 19D is a diagram depicting an example of signal flow in the UE depicted in FIG. 19C.

DESCRIPTION OF THE INVENTION

Figure 2A:
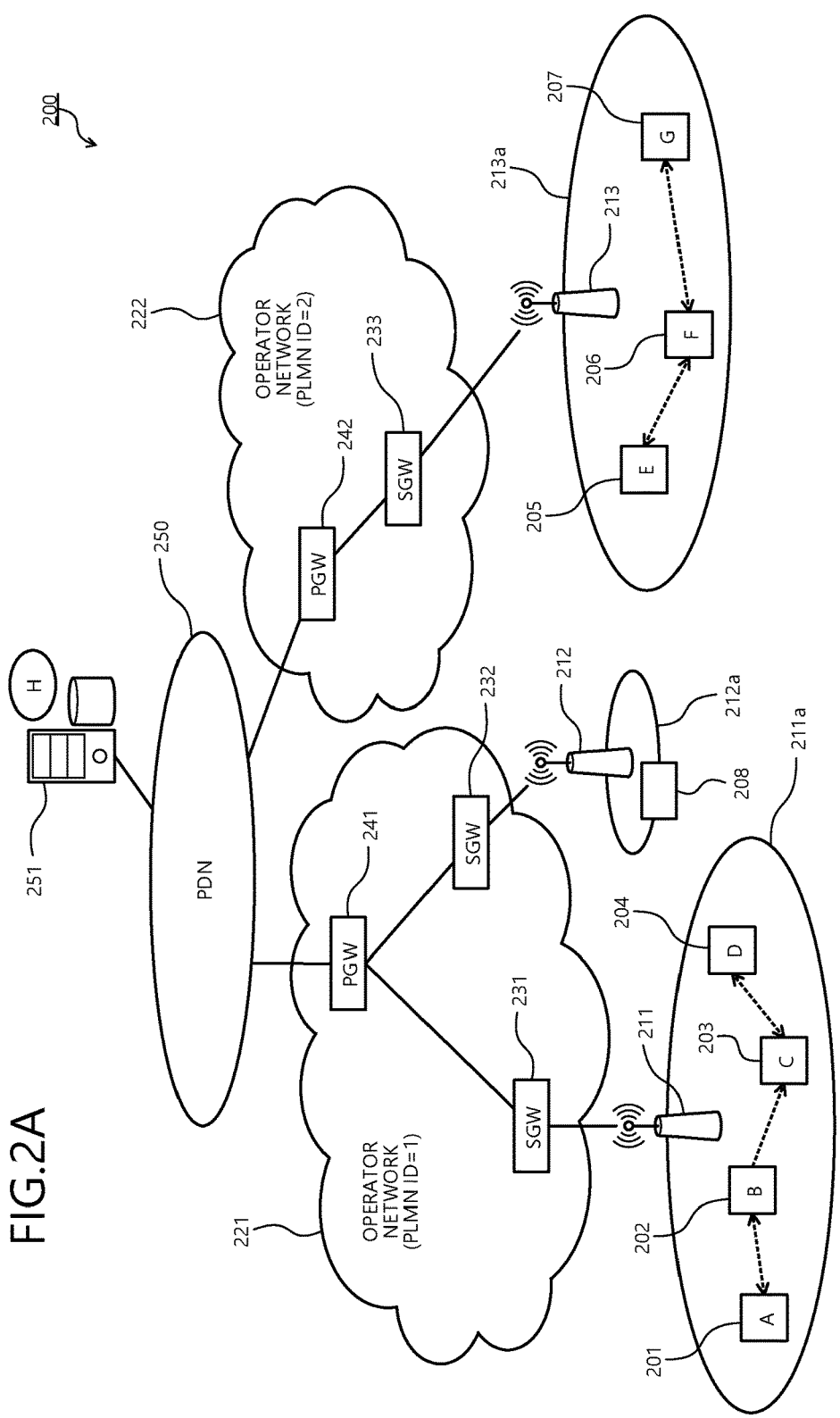
FIG. 2A is a diagram depicting an example of a communications system according to a second embodiment.

Embodiments of a communications system, a communications method, a communications apparatus, and a mobile terminal according to the present invention will be described in detail with reference to the accompanying drawings.

FIG. 1A is a diagram depicting an example of the communications system according to a first embodiment. FIG. 1B is a diagram depicting an example of signal flow in the communications system depicted in FIG. 1A. As depicted in FIGS. 1A and 1B, a communications system 100 according to the first embodiment includes a first mobile terminal 110, a second mobile terminal 120, and a communications apparatus 130.

The second mobile terminal 120 includes one or more mobile terminals in a state of being unable to directly communicate with the first mobile terminal 110. When the second mobile terminal 120 is present in plural, the respective second mobile terminals 120 may be wirelessly connected to different base stations, or may be wirelessly connected to a same base station.

Among the second mobile terminals 120, one second mobile terminal 120 that has connected to a base station 101 will be described. The second mobile terminal 120 is able to communicate with a network 102 via the base station 101. The second mobile terminal 120 includes a transmitting unit 121.

The transmitting unit 121 transmits, via the base station 101 to the network 102, information indicating services that may be provided when the mobile terminal thereof (the second mobile terminal 120) performs inter-terminal communication. Inter-terminal communication, for example, includes communication performed directly between terminals and communication performed between terminals via a network (for example, a base station). Services that are able be provided by inter-terminal communication, for example, are services that are able to be provided in direct communication between terminals and services that are able to be provided by communication between terminals via a network.

The communications apparatus 130 is a communications apparatus provided on the network 102. The communications apparatus 130 includes a receiving unit 131 and a transmitting unit 132. The receiving unit 131 receives service information transmitted by the second mobile terminal 120. The communications apparatus 130 extracts from among services indicated by the service information received by the receiving unit 131, a communications service that the first mobile terminal 110 is able to use.

The communications apparatus 130 transmits to the first mobile terminal 110, by the transmitting unit 132, information related to the extracted communications service that the first mobile terminal 110 is able to use. Information related to a communications service, for example, is information indicating a communications service. Further, information related to a communications service may be information that includes identification information of the second mobile terminal 120 that is able to provide the communications service. Transmission of information related to a communications service by the transmitting unit 132, for example, is performed via a base station 103 to which the first mobile terminal 110 is connected. The base station 103 may be the base station 101, or may be a base station other than the base station 101.

The first mobile terminal 110 includes a receiving unit 111. The receiving unit 111 receives from the communications apparatus 130 of the network 102, information related to a communications service that the first mobile terminal 110 is able to use among the communications services that the second mobile terminal 120 is able to provide. The first mobile terminal 110, for example, based on the information related to a communications service received by the receiving unit 111, performs inter-terminal communication with a mobile terminal among the second mobile terminals 120.

In this way, according to the first embodiment, the communications apparatus 130 on the network 102 is able to use service information collected from the second mobile terminals 120 and notify the first mobile terminal 110 of an inter-terminal communication service that the first mobile terminal 110 is able to use.

As a result, from among the second mobile terminals 120 including mobile terminals in a state of being unable to directly communicate with the first mobile terminal 110, a mobile terminal to perform inter-terminal communication with the first mobile terminal 110 may be detected. Therefore, wide range discovery not limited to mobile terminals capable of directly communicating with the first mobile terminal 110 becomes possible.

The first mobile terminal 110 may also be provided with the transmitting unit 121, and may transmit to the network 102, via the base station 103, information indicating services that the first mobile terminal 110 is able to provide in inter-terminal communication. In this case, the communications apparatus 130 may use the service information received from the first mobile terminal 110 to extract a communications service that a mobile terminal different from the first mobile terminal 110 is able to use.

The communications apparatus 130 may extract a communications service that the first mobile terminal 110 is able to use, based on an allowable amount of delay of a communications service that the second mobile terminal 120 is able to provide and an estimated amount of delay of communication in a connection path between the first mobile terminal 110 and the second mobile terminal 120. For example, the communications apparatus 130 extracts a communications service that the first mobile terminal 110 is able to use, from among communications services that exclude communications services for which the estimated amount of delay exceeds the allowable amount of delay, among the communications service that the second mobile terminal 120 is able to provide. As a result, the first mobile terminal 110 may be notified of a communications service for which the estimated amount of delay is the allowable amount of delay or less.

For example, the service information transmitted by the second mobile terminals 120 includes information indicating the allowable amounts of delay of the communications services that the second mobile terminals 120 are able to provide in inter-terminal communication. As a result, the communications apparatus 130 may identify from the service information, the allowable amounts of delay of the communications services that the second mobile terminals 120 are able to provide in inter-terminal communication. Further, the allowable amounts of delay of the communications services that the second mobile terminals 120 are able to provide in inter-terminal communication may be pre-stored according to communications service type in a memory of the communications apparatus 130. Further, the communications apparatus 130 may obtain from an external database or the like, the allowable amounts of delay of the communications services that the second mobile terminals 120 are able to provide in inter-terminal communication.

The communications apparatus 130, for example, obtains information indicating the type of connection path between a first mobile terminal 110 and a second mobile terminal 120 according to connection destinations (base station, operator network, etc.) of the first mobile terminal 110 and the second mobile terminal 120. In this case, the communications apparatus 130 is able to obtain an estimated amount of delay in a connection path between the first mobile terminal 110 and the second mobile terminal 120, based on the obtained information.

The communications apparatus 130 may obtain an estimated amount of delay in a connection path between the first mobile terminal 110 and the second mobile terminal 120, based on information indicating whether direct communication between the first mobile terminal 110 and the second mobile terminal 120 is possible. Information indicating whether direct communication between the first mobile terminal 110 and the second mobile terminal 120 is possible, for example, may be obtained from at least one of the first mobile terminal 110 and the second mobile terminal 120. For example, when direct communication between the first mobile terminal 110 and the second mobile terminal 120 is possible, the connection path between the first mobile terminal 110 and the second mobile terminal 120 includes direct communication and the amount of delay may be judged to be minimal.

The second mobile terminals 120 may include mobile terminals that belong to differing telecommunications carriers. In this case, the communications apparatus 130, for example, may receive the service information of the second mobile terminals 120 via communications apparatuses (management apparatuses) of networks of telecommunications carriers to which the second mobile terminals 120 belong.

The communications apparatus 130 may obtain server information that indicates communications services that a server connected to a network (for example, the network 102) is able to provide to a mobile terminal (for example, the first mobile terminal 110), via a base station. The server information, for example, may store server related information and may be received from an external database of the communications apparatus 130.

The communications apparatus 130 extracts from among services indicated by the obtained server information and services indicated by the service information received from a second mobile terminal 120, a communications service that the first mobile terminal 110 is able to use. In this way, a communications service that the first mobile terminal 110 is able to use may include a communications service that a server is able to provide via a base station, without limitation to communications services that the second mobile terminals 120 are able to provide. As a result, wide range discovery becomes possible.

The second mobile terminal 120 may transmit to the network 102, via the base station 101, detection information indicating services that a mobile terminal able to perform direct communication with the second mobile terminal 120 and detected by the second mobile terminal 120 using a detection-use signal is able to provide. The communications apparatus 130 extracts from among services indicated by the service information received from the second mobile terminal 120 and services indicated by the detection information received from the second mobile terminal 120, a communications service that the first mobile terminal 110 is able to use. Thus, a communications service that the first mobile terminal 110 is able to use may include a service of a mobile terminal detected by the second mobile terminal 120 via a detection-use signal, without limitation to communications services provided by the second mobile terminals 120. As a result, wide range discovery becomes possible.

FIG. 2A is a diagram depicting an example of a communications system according to a second embodiment. As depicted in FIG. 2A, a communications system 200 according to the second embodiment includes user equipment: user terminals) (UEs) 201 to 208, eNBs 211 to 213 (evolved Node Bs), and operator networks 221, 222.

The communications system 200 includes serving gateways (SGWs) 231 to 233, and packet data network-gateways (PGWs) 241, 242. The communications system 200 further includes a packet data network (PDN) 250, and a cloud server 251(H).

Each of the eNBs 211 to 213 is a base station that wirelessly communicates with UEs in the cell thereof. Cells 211a to 213a are respective cells of the eNBs 211 to 213.

The UEs 201 to 204 (A to D) are connected to the eNB 211. The UE 201 receives a detection-use signal from the UE 202 and thereby detects the UE 202 as a device with which D2D communication is possible. The UE 202 receives a detection-use signal from the UE 201 and thereby detects the UE 201 as a device with which D2D communications is possible. The UE 203 receives detection-use signals from the UEs 202, 204 and thereby detects the UEs 202, 204 as devices with which D2D communication is possible. The UE 204 receives a detection-use signal from the UE 203 and thereby detects the UE 203 as a device with which D2D communication is possible.

The UEs 205 to 207 (E to G) are connected to the eNB 213. The UE 205 receives a detection-use signal from the UE 206 and thereby detects the UE 206 as a device with which D2D communication is possible. The UE 206 receives detection-use signals from the UEs 205, 207 and thereby detects the UEs 205, 207 as devices with which D2D communication is possible. The UE 207 receives a detection-use signal from the UE 206 and thereby detects the UE 206 as a device with which D2D communication is possible.

The eNB 211 is connected to the SGW 231 of the operator network 221. The eNB 212 is connected to the SGW 232 of the operator network 221. The eNB 213 is connected to the SGW 233 of the operator network 222.

The operator network 221 includes the SGWs 231, 232 and the PGW 241. In the example depicted in FIG. 2A, a public land mobile network (PLMN) ID that is the identification information of the operator network 221 is "1". The SGW 231 is a gateway between the eNB 211 and the operator network 221. The SGW 232 is a gateway between the eNB 212 and the operator network 221. The SGWs 231, 232 are connected to the PGW 241. The PGW 241 is a gateway between the operator network 221 and the PDN 250.

The operator network 222 includes the SGW 233 and the PGW 242. In the example depicted in FIG. 2A, a PLMN ID that is the identification information of the operator network 222 is "2". The SGW 233 is a gateway between the eNB 213 and the operator network 222. The SGW 233 is connected to the PGW 242. The PGW 242 is a gateway between the operator network 222 and the PDN 250.

The PDN 250 is an external network to which an evolved packet core (EPC) (mobile core) of the operator networks 221, 222, etc. connects. The PGWs 241, 242 and the cloud server 251 are connected to the PDN 250.

Figure 2B:
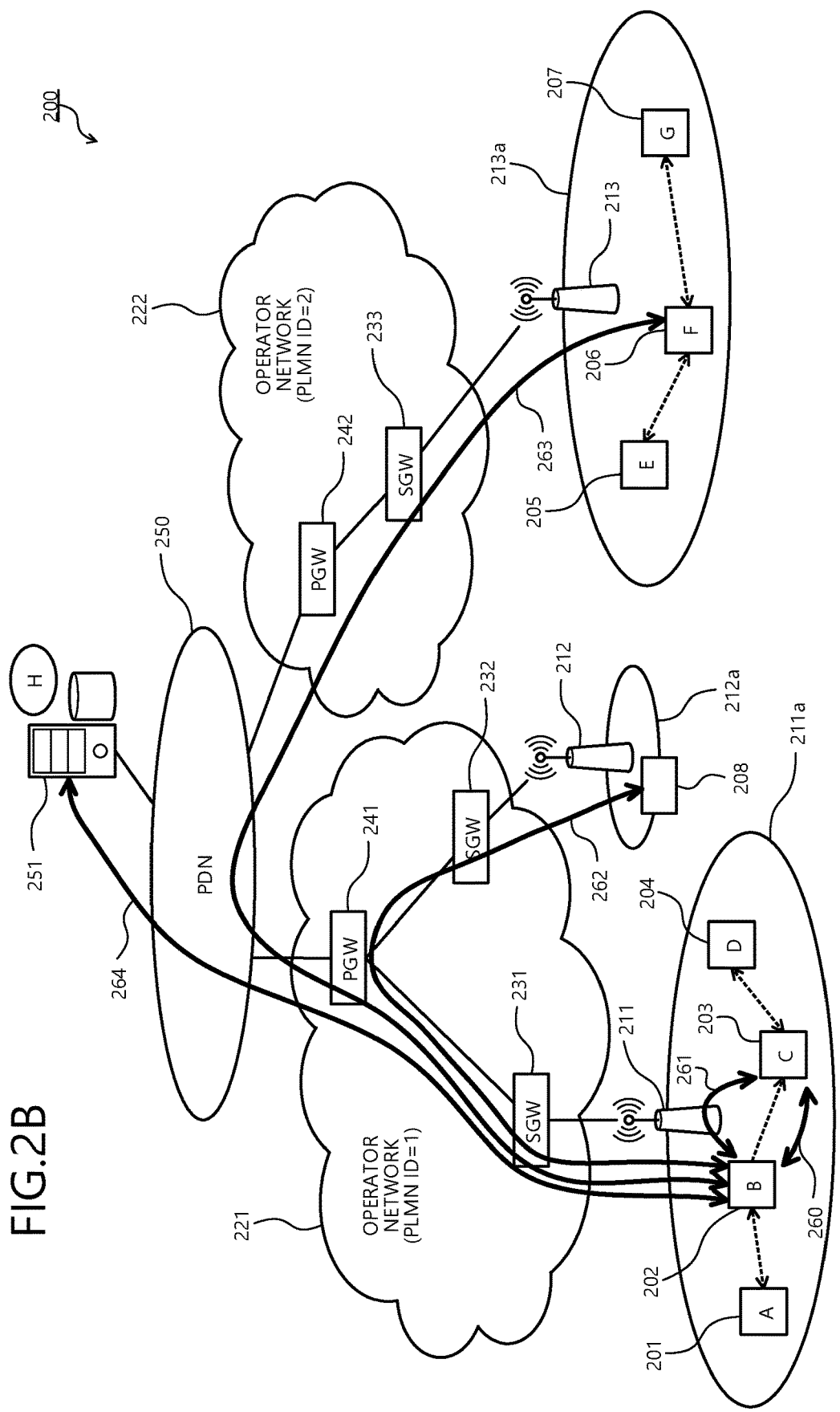
FIG. 2B is a diagram depicting an example of connection links in the communications system.

FIG. 2B is a diagram depicting an example of connection links in the communications system. In FIG. 2B, portions identical to those in FIG. 2A are given the same reference numerals used in FIG. 2A and description thereof is omitted hereinafter. Here, although connection links of the UE 202(B) will be described, the description is similar concerning the other UEs. For example, in the communications system 200, connection links 260 to 264 are connection links of the UE 202.

The connection link 260 is a connection link executed between nearby UEs performing D2D communication (ProSe) bypassing a base station. For example, the UE 202 is able to bypass the eNB 211 and perform inter-device communication of directly communicating with the UE 201.

The connection link 261 is a link that bypasses the SGW and connects UEs belonging to a same base station, via the base station. For example, the UE 202 is able to perform inter-device communication with the UE 203, via a cell 211a.

For example, enhancements for infrastructure based data communication between devices (ICBD) may be used in the connection link 261. Further, local IP access (LIPA), for example, may be used in the connection link 261.

The connection link 262 is a link (via the PGW) that connects UEs belonging to the same operator network, via the PGW of the operator network and bypasses the PDN 250. For example, the UE 202 is able to perform inter-device communication with the UE 208, via the eNB 211, the SGW 231, the PGW 241, the SGW 232, and the eNB 212.

The connection link 263 is a link connecting UEs via the PDN 250. The connection link 263 enables connection even between UEs that belong to different operators. For example, the UE 202 is able to perform inter-device communication with the UE 206, via the eNB 211, the SGW 231, the PGW 241, the PDN 250, the PGW 242, the SGW 233, and the eNB 213.

The connection link 264 is a link (via the Internet) that connects a UE with the cloud server 251, via the PDN 250. For example, the UE 202 is able to communicate with the cloud server 251, via the eNB 211, the SGW 231, the PGW 241, and the PDN 250.

In addition to the connection links 260 to 264, various types of connection links may be used in the communications system 200. For example, the UE 202 is able to perform cloud communication with the UE 206, via the eNB 211, the SGW 231, the PGW 241, the PDN 250, the cloud server 251, the PDN 250, the PGW 242, the SGW 233, and the eNB 213. Further, a connection link that connects UEs belonging to the same SGW and bypasses the PGW may be used. Further, various types of communication links using selected IP traffic offload (SIPTO), etc. may be used.

FIG. 3 is a diagram depicting an example of a communications system provided with a DSF. As depicted in FIG. 3, the communications system 200 according to a second embodiment includes UEs 301 to 305, eNBs 311, 312, a core network 320, and an M2M platform 330.

The UEs 301 to 305, for example, are UEs corresponding to the UEs 201 to 208 depicted in FIGS. 2A and 2B. The UEs 301, 302 are connected to a cell 311a of the eNB 311. The UEs 303 to 305 are connected to a cell 312a of the eNB 312. The eNBs 311, 312, for example, are eNBs corresponding to the eNBs 211 to 213 depicted in FIGS. 2A and 2B. The eNBs 311, 312 are connected to a DSF 321 included in the core network 320.

The core network 320, for example, is a network corresponding to at least one of the operator networks 221, 222 and the PDN 250 depicted in FIGS. 2A and 2B. The core network 320 includes the DSF 321 (Discovery Service Function), a mobility management entity (MME) 322, and a device service database 323.

The DSF 321 is a communications apparatus that provides a discovery service function to the UEs 301 to 305, via the eNBs 311, 312. For example, the DSF 32 collects service information and ProSe discovery information from the UEs 301 to 305 via the eNBs 311, 312 and consolidates the collected information to the device service database 323. The device service database 323, for example, may be realized by a storage apparatus provided in the DSF 321. Alternatively, the device service database 323 may be realized by an external storage apparatus of the DSF 321.

Service information is information that indicates services (applications) of inter-device communication corresponding to the UEs 301 to 305. Further, the service information may include information indicating the allowable amounts of delay of the services. Inter-device communication, for example, is a service that may be executed by both D2D communication of performing direct communication between devices and communication via a network. Each of the UEs 301 to 305 transmits service information indicating services of inter-device communication corresponding thereto to the DSF 321, via the eNBs 311, 312.

ProSe discovery information is information that indicates a UE detected by an exchange of discovery signals among the UEs 301 to 305 and with which D2D communication is possible, and that indicates services (applications) that the UE is able to use by D2D communication.

Each of the UEs 301 to 305 exchange discovery signals to thereby perform device-service discovery of detecting a UE with which D2D communication is possible and services that are able to be used by D2D communication with the UE. Each of the UEs 301 to 305 transmits to the DSF 321, via the eNBs 311, 312, ProSe discovery information indicating a result of the device-service discovery.

The MME 322 is a node that manages position registration of the UEs, calling, handover between base stations, etc. For example, the MME 322 belongs to the core network 320 and with respect to a UE in a connected state, obtains information indicating the connected cell, the SGW, the operator network (PGW), etc. With respect to a combination of UEs, the MME 322 identifies based on the obtained information, a connection link (type of connection path) that is possible between the UEs and transmits to the DSF 321, network connection information indicating the identified connection link.

For example, with respect to the UEs 201 to 207 depicted in FIGS. 2A and 2B, the MME 322 is able to determine that at least connection to the cloud server 251 by a connection link "via the Internet" via the PDN 250 is possible. For example, the MME 322 is able to determine that connection between the UE 202 and the cloud server 251 is possible by the connection link 264 of "via the Internet".

Further, with respect to the UEs 201 to 207 depicted in FIGS. 2A and 2B, the MME 322 is able to determine that at least connection thereamong is possible by a connection link "inter-operator communication" via the PDN 250. For example, the MME 322 is able to determine that connection between the UE 202 and the UE 206 is possible by the connection link 263 of "inter-operator communication".

Further, with respect to a combination of UEs belonging to the same operator network, the MME 322 is able to determine that connection thereamong is possible by a connection link of "via PGW" that bypasses the PDN 250. For example, the MME 322 is able to determine that the UE 202 and the UE 208 are connectable by the connection link 262 of "via PGW".

Further, with respect to a combination of UEs belonging to the same base station, the MME 322 is able to determine that connection thereamong is possible by a connection link of "eICBD" that bypasses the PGW and the SGW. For example, the MME 322 is able to determine that connection between the UE 202 and the UE 203 is possible by the connection link 261 of "eICBD".

Thus, the MME 322 uses information concerning the connection destinations of the UEs and for combinations of the UEs, is able to identify connection links that are possible between the UEs, and transmits to the DSF 321, network connection information indicating the identified connection links.

The MME 322 may further transmit to the DSF 321, position registration information indicating a tracking area of the UEs managed by the MME 322. In this case, with respect to a combination of UEs, the DSF 321 is able to identify connection links that are possible between the UEs, based on the position registration information received from the MME 322, and thereby obtain network connection information. Connection link identification based on position registration information will be described hereinafter.

For each of the UEs 301 to 305, the DSF 321 filters the collected information to extract services that the UE 301 to 305 is able to use and transmits a service list indicating the extracted results to the UE 301 to 305.

The DSF 321 further refers to a M2M service database 331 of the M2M platform 330 and may include a M2M (Machine to Machine) service among candidates of services that the UEs 301 to 305 are able to use. An M2M service, for example, is a service that enables the UEs 301 to 305 to access (obtain information, control) a lamp or air conditioner at a residence.

The M2M platform 330 is facility group for providing an M2M service. At communications apparatuses included in the M2M platform 330, an M2M application that provides an M2M service is executed. The M2M platform 330 includes the M2M service database 331. The M2M service database 331 stores information related to M2M services provided in the M2M platform 330. The cloud server 251 depicted in FIGS. 2A and 2B, for example, is an M2M device that is included in the M2M platform 330 and provides an M2M service.

Thus, in the communications system 200, ProSe discovery information and service information in the UEs is consolidated by the DSF 321 (the device service database 323). Further, the DSF 321 refers to external service information (for example, a M2M service) that is usable and provides to the UEs, a service list indicating services that the UEs are able to use. The DSF 321 further filters the services based on position registration information and network connection information obtained from the MME 322 and provides a service list based on filtering results.

The first mobile terminal 110 and the second mobile terminal 120 depicted in FIGS. 1A and 1B, for example, may be realized by the UE 201 to 208 and the UEs 301 to 305. The communications apparatus 130 depicted in FIGS. 1A and 1B, for example, may be realized by the DSF 321.

The base stations 101, 103 depicted in FIGS. 1A and 1B, for example, may be realized by the eNBs 211 to 213 and the eNBs 311, 312. The network 102 depicted in FIGS. 1A and 1B, for example, may be realized by the core network 320.

Figure 4:
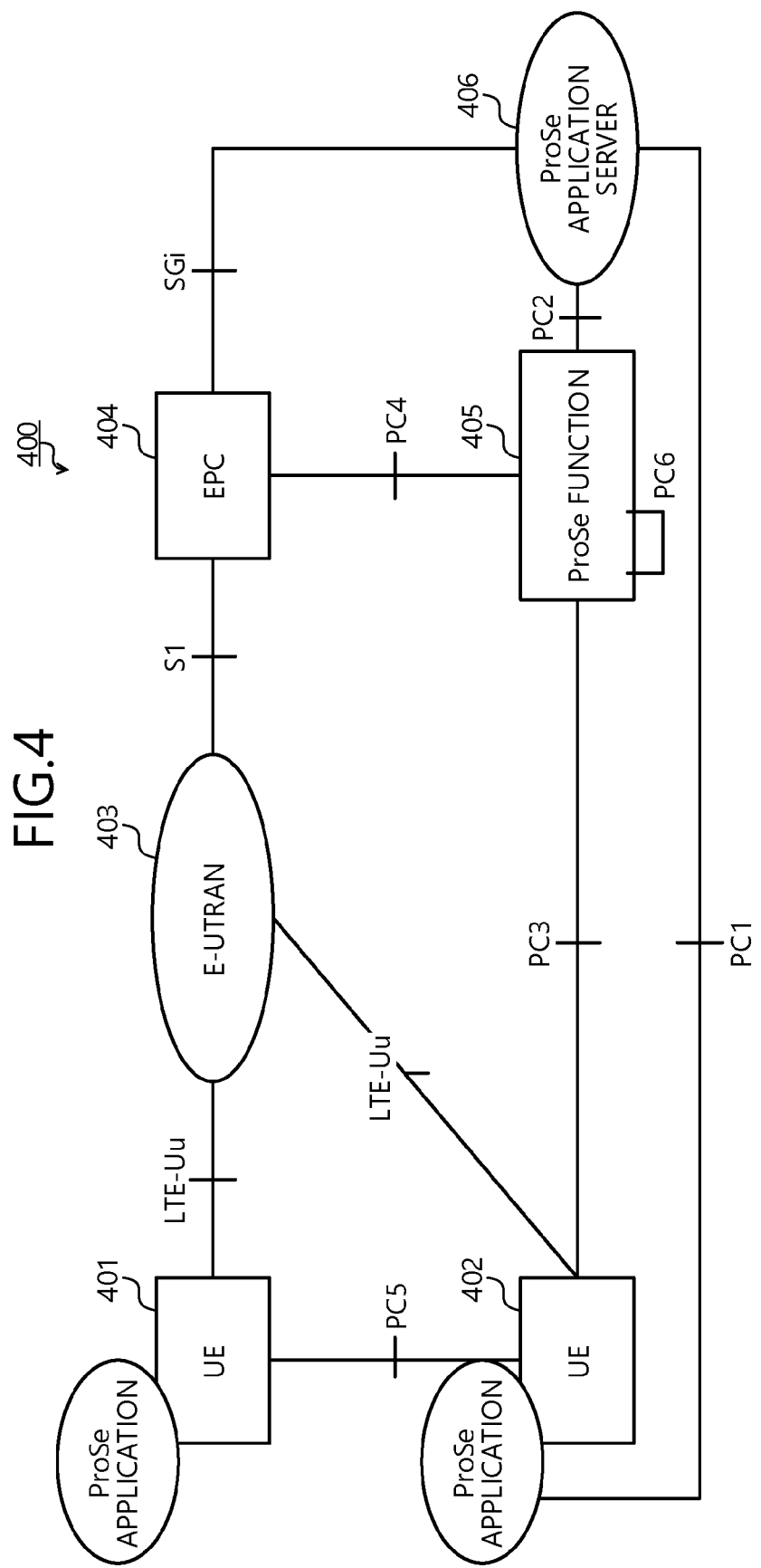
FIG. 4 is a diagram depicting an example of a communications system that provides ProSe.

FIG. 4 is a diagram depicting an example of a communications system that provides ProSe. A communications system 400 depicted in FIG. 4 is a communications system that provides ProSe specified in TR23.703 of 3GPP.

The communications system 400 includes UEs 401, 402, an evolved universal terrestrial radio access network (E-UTRAN) 403, and an EPC 404. The communications system 400 further includes a ProSe function 405, and a ProSe application server 406.

The UEs 401, 402 are able to execute a ProSe application that performs the various types of ProSe discovery described above. The UEs 401, 402, for example, use ProSe by accessing the ProSe function 405 and the ProSe application server 406 via the E-UTRAN 403 and the EPC 404.

The ProSe function 405 is a communications apparatus on the network side that provides the ProSe function. In the ProSe function includes ProSe direct discovery of performing discovery by exchanges of discovery signals directly between devices and EPC level ProSe discovery of performing discovery on the core network side.

The ProSe application server 406 is a server that provides a service that uses a ProSe function provided by the ProSe function 405. The ProSe application server 406 may be provided on the operator network of a telecommunications carrier or may be provided on an external network of the operator network.

The ProSe function 405 and the ProSe application server 406 may be realized by a single communications apparatus. Further, the ProSe function 405 and the ProSe application server 406 may include the EPC 404, etc.

The DSF 321 depicted in FIG. 3, for example, may be implemented in the ProSe function 405 and the ProSe application server 406.

Figure 5:
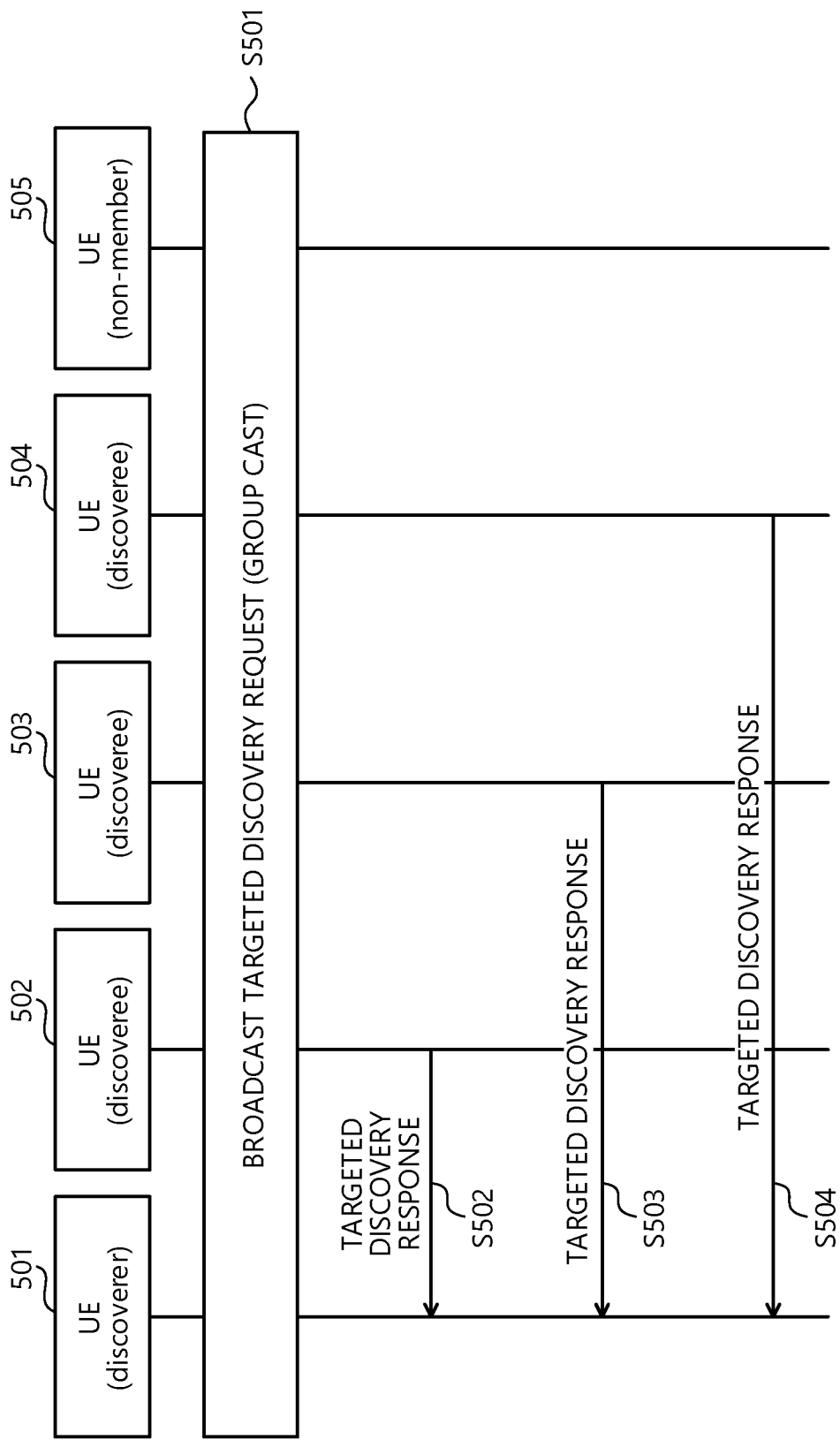
FIG. 5 is a sequence diagram depicting an example of ProSe direct discovery.

FIG. 5 is a sequence diagram depicting an example of ProSe direct discovery. UEs 501 to 505 depicted in FIG. 5, for example, are UEs corresponding to the UEs 201 to 208 depicted in FIG. 2A and/or the UEs 301 to 305 depicted in FIG. 3. First, the UE 501, which is a discovery actor (discoverer), wirelessly broadcasts (or group-casts) a targeted discovery request (step S501).

The targeted discovery request includes an application group ID (App Group ID) of the transmission destination, an application personal ID (App Personal ID) of the UE 501, etc. In the example depicted in FIG. 5, in a group indicated by the application group ID of the targeted discovery request, the UEs 502 to 504 (discoveree) are assumed to be included and the UE 505 (non-member) is assumed to not be included.

In this case, the UE 502 wirelessly transmits to the UE 501, a targeted discovery response for the targeted discovery request (step S502). The targeted discovery response transmitted by the UE 502 includes, for example, the application personal ID of the UE 502.

Further, the UE 503 wirelessly transmits to the UE 501, a targeted discovery response for the targeted discovery request (step S503). The targeted discovery response transmitted by the UE 503, for example, includes the application personal ID of the UE 503.

The UE 504 wirelessly transmits to the UE 501, a targeted discovery response for the targeted discovery request (step S504). The targeted discovery response transmitted by the UE 504, for example, includes the application personal ID of the UE 504.

The UE 505 does not transmit a targeted discovery response since the UE 505 is not included in the group indicated by the application group ID of the targeted discovery request transmitted by the UE 501.

As a result, the UE 501 is able to detect the UEs 502 to 504 as devices with which D2D communication is possible.

Figure 6A:
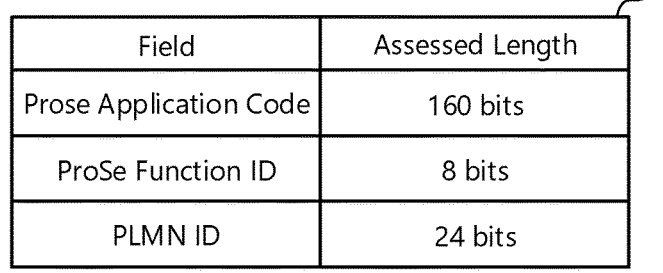
FIG. 6A is a diagram depicting an example of a discovery message.

FIGS. 6A and 6B are diagrams depicting an example of a discovery message. Under LTE-Advanced, a mechanism for realizing direct wireless communication between devices (UEs) is being studied. For example, methods are being studied where devices transmit a discovery signal and nearby devices detect theses discovery signals whereby a device with which direct communication is possible and information related to the device is obtained.

For example, transmission of a discovery message 610 depicted in FIG. 6A and a discovery message 620 depicted in FIG. 6B by devices as discovery signals in this case is being studied. The discovery message 610 is a 192-bit discovery message in a non-public safety open discovery use case. The discovery message 620 is a discovery message in a public safety use case.

For example, the discovery message 620 includes "Source L2 ID/Prose UE ID of source", "Destination L2 ID", "Prose Application ID", etc.

"Source L2 ID/Prose UE ID of source" indicates an address of the transmission source. "Destination L2 ID" indicates an address of the transmission destination. "Prose Application ID" indicates an application related to D2D communication provided by the transmission source.

In the ProSe direct discovery using the discovery messages 610, 620, etc., since discovery is performed between devices, the communication destination of the D2D communication is restricted in that the communication destination is limited to a device that is able to detect the discovery signal. However, in an application using inter-device communication, whether the communication destination is a ProSe terminal may be irrelevant and therefore, absence of such restrictions is required.

In contrast, the DSF 321 collects service information and ProSe discovery information from UEs and based on the collected information, notifies the UEs of services that may be used and thereby, enables wide range discovery not limited to devices capable of direct communication.

Figure 7:
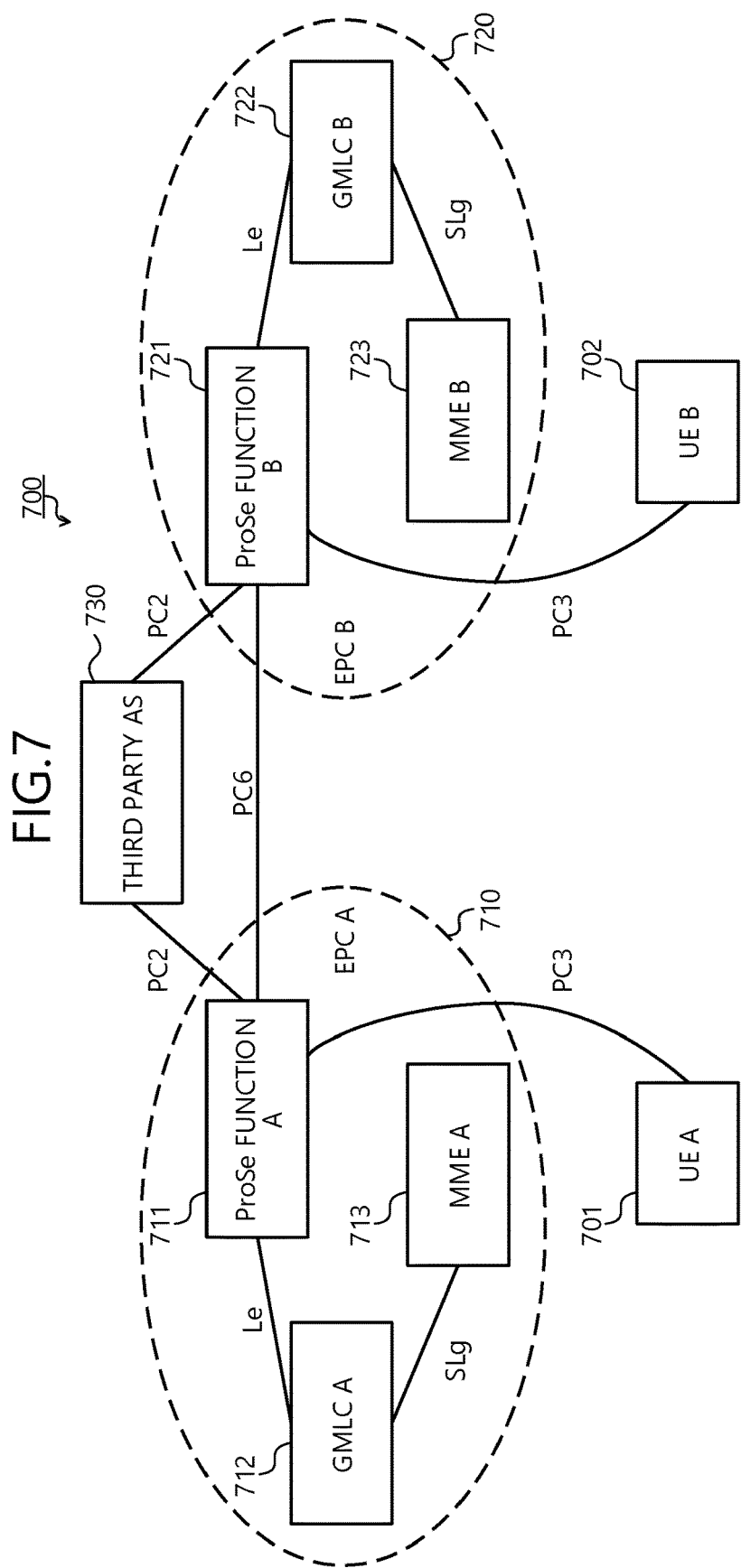
FIG. 7 is a diagram depicting an example of a communications system that provides EPC level ProSe discovery.

FIG. 7 is a diagram depicting an example of a communications system that provides EPC level ProSe discovery. A communications system 700 depicted in FIG. 7 is a communications system specified under TR23.703 of 3GPP and that realizes ProSe discovery across operators. In the communications system 700, ProSe discovery processing is performed on a core network side whereby ProSe discovery across operators becomes possible.

The communications system 700 includes a UE 701 (UE A), a UE 702 (UE B), an EPC 710 (EPC A), an EPC 720 (EPC B), and a third party autonomous system (AS) 730.

The EPC 710 is an EPC of an operator A. The EPC 720 is an EPC of an operator B different from the operator A. The UE 701 is a UE that uses the operator A and is connected to the EPC 710. The UE 702 is a UE that uses the operator B and is connected to the EPC 720.

The EPC 710 includes a ProSe function 711 (ProSe function A), a gateway mobile location center (GMLC) 712 (GMLC A), and an MME 713 (MME A). The GMLC 712 is connected to the MME 713 and manages position information of a UE (for example, the UE 701) connected to the EPC 710.

The ProSe function 711 obtains from the GMLC 712, the position information of each UE connected to the EPC 710. The ProSe function 711 further obtains from a ProSe function 721, the position information of each UE connected to the EPC 720. The ProSe function 711 detects a UE near the UE 701, based on the obtained position information. For example, when detecting the UE 702 as a UE near the UE 701, the ProSe function 711 notifies the UE 701 of the detection result and initiates D2D communication between the UE 701 and the UE 702.

The EPC 720 includes the ProSe function 721 (ProSe function B), a GMLC 722 (GMLC B), and a MME 723 (MME B). The GMLC 722 is connected to the MME 723 and manages the position information of a UE (for example, the UE 702) connected to the EPC 720.

The ProSe function 721 obtains from the GMLC 722, the position information of each EU connected to the EPC 720. The ProSe function 721 further obtains from the ProSe function 711, the position information of each EU connected to the EPC 710. The ProSe function 721 detects a UE near the UE 702, based on the obtained position information. For example, when detecting the UE 701 as a UE near the UE 702, the ProSe function 721 notifies the UE 702 of the detection result and initiates D2D communication between the UE 701 and the UE 702.

The third party AS 730 is a third-party manufactured autonomous system connected to both of the EPCs 710, 720. The ProSe functions 711, 721, for example, are connected to the third party AS 730. Discovery by the ProSe function 711, 721, for example, is managed by the third party AS 730.

Figure 8:
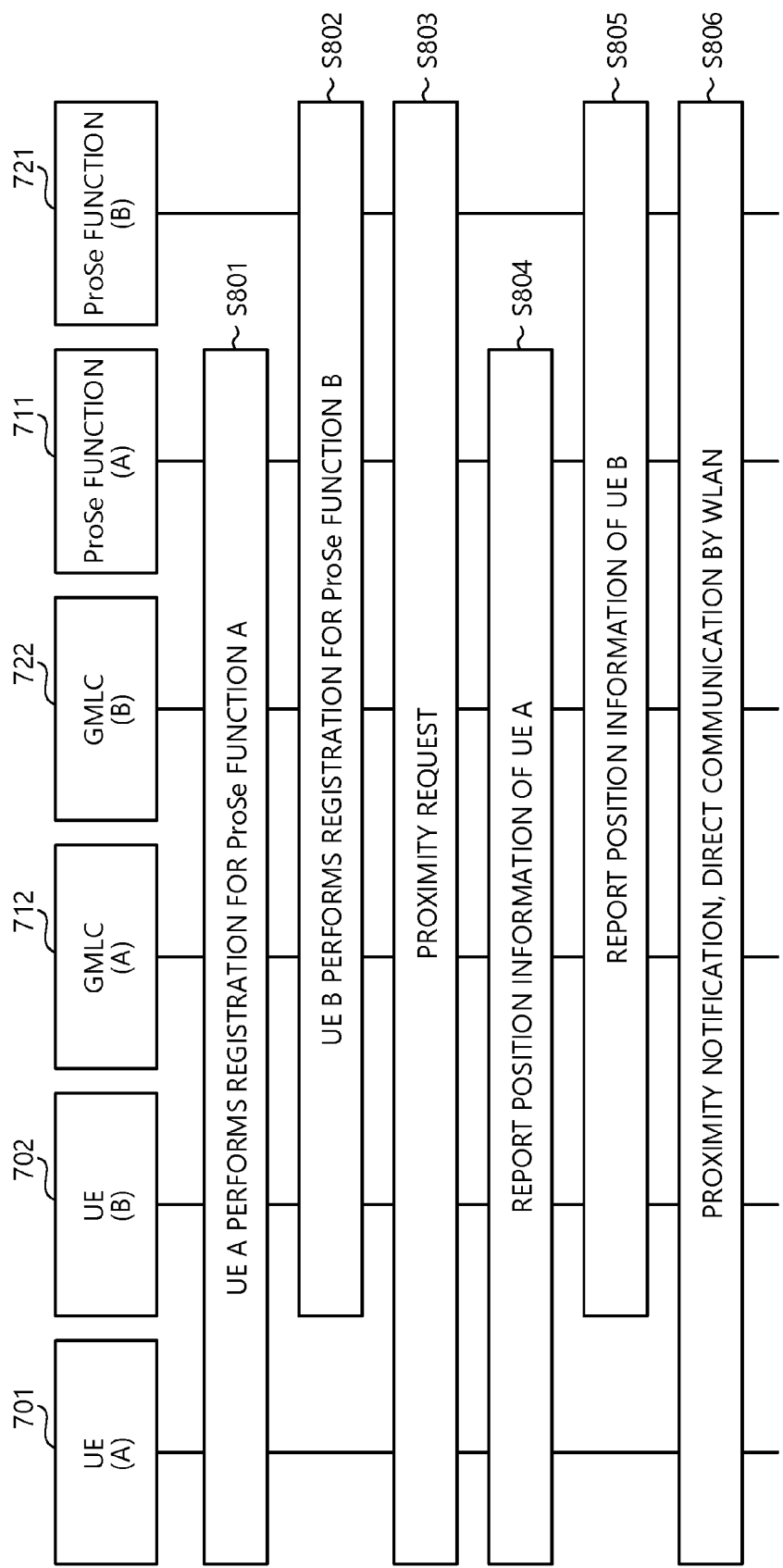
FIG. 8 is a sequence diagram depicting an example of ProSe discovery across operators.

FIG. 8 is a sequence diagram depicting an example of ProSe discovery across operators. In ProSe discovery across operators specified under TR23.703 of 3GPP, for example, the steps depicted in FIG. 8 are executed.

The UE 701 (UE A) performs registration concerning the ProSe function 711 (ProSe function A) (step S801). The UE 702 (UE B) performs registration concerning the ProSe function 721 (ProSe function B) (step S802). The registration at steps S801 and S802, for example, are managed by the third party AS 730.

The UE 701 makes a proximity request to the UE 702 (step S803). The ProSe function 711, for example, may request periodic updates of the position information of the UE 702 from the ProSe function 721. The proximity request at step S803, for example, is managed by the third party AS 730.

The UE 701 reports the position information of the UE 701 to the ProSe function 711, via the GMLC 712 (step S804). The UE 702 reports the position information of the UE 702 to the ProSe function 721, via the GMLC 722 (step S805). The ProSe function 711 is notified of the position information from the UE 702, via the ProSe function 721.

The ProSe function 711 detects the proximity of the UEs 701, 702 based on the position information of the UE 701 reported from the UE 701 and the position information of the UE 702 notified by the ProSe function 721. When proximity of the UEs 701, 702 is detected, the proximity of the UEs 701, 702 is notified to the UEs 701, 702 (proximity notification). Direct communication between the UEs 701, 702 begins by a wireless local area network (WLAN) (step S806).

Figure 9:
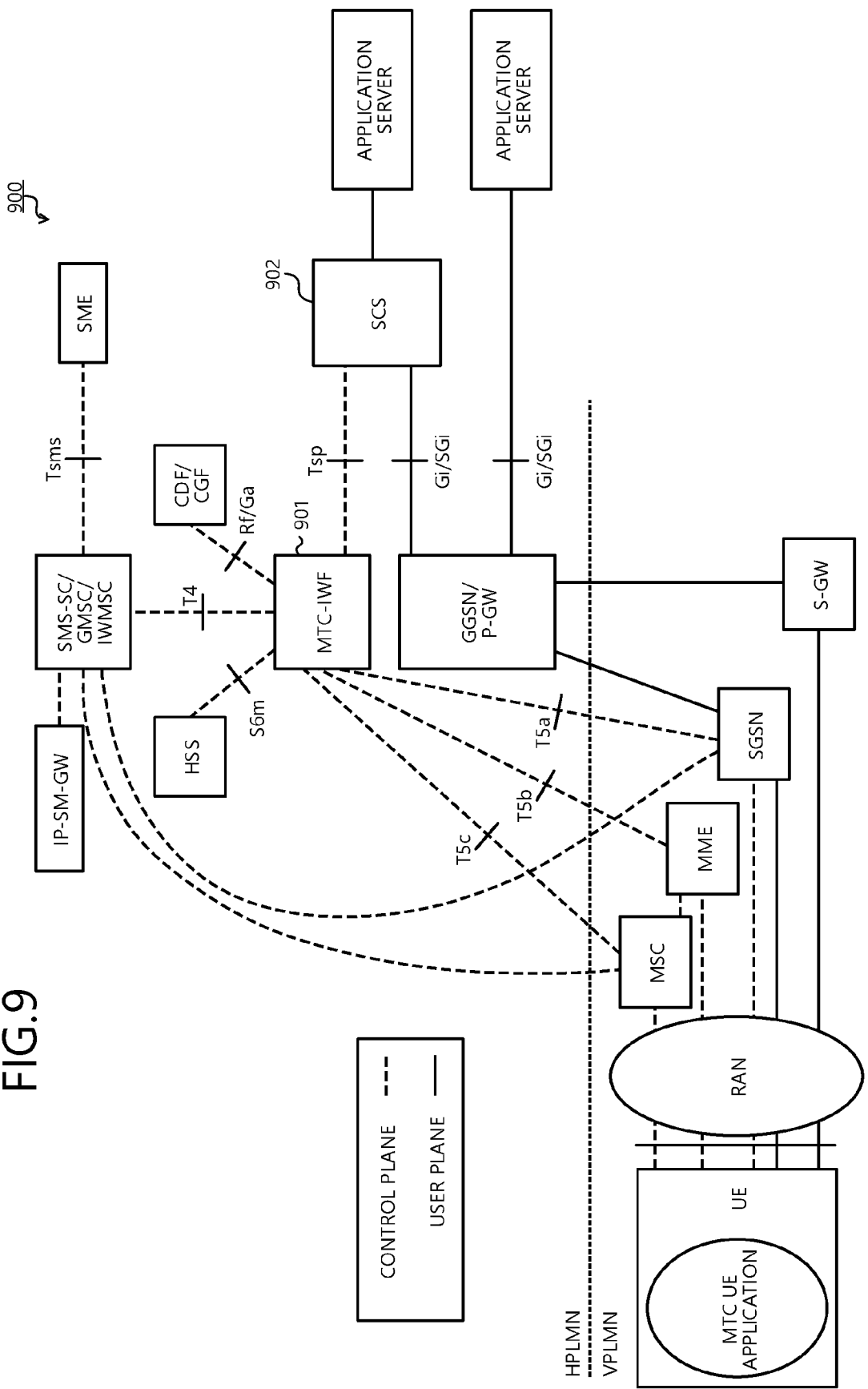
FIG. 9 is a diagram depicting an example of a communications system that supports M2M.

FIG. 9 is a diagram depicting an example of a communications system that supports M2M. Technology that supports M2M under 3GPP is being studied. For example, under TS23.682 of 3GPP related to extended functionality of architecture that facilitates communication of a packet data network and an application, a communications system 900 depicted in FIG. 9 has been disclosed as architecture for machine type communication (MTC).

On a home public land mobile network (HPLMN) side of the communications system 900, an MTC-inter working function (MTC-IWF) 901 and service capability server (SCS) 902 are included.

The MTC-IWF 901 provides an interface from an application side to a 3GPP operator network. The SCS 902 provides a service that uses MTC. The MTC-IWF 901 and the SCS 902, for example, are M2M servers having a function of controlling an M2M device such as a vending machine or a sensor, and the MTC-IWF 901 and the SCS 902 manage information indicating the positions of M2M devices and services that may be provided by the M2M devices. For example, the SCS 902 generates a trigger of an application (MTC device) of a UE related to MTC and selects an MTC-IWF (for example, the MTC-IWF 901).

M2M service discovery, for example, may be performed by obtaining information managed by an M2M server such as the MTC-IWF 901 or the SCS 902. In other words, the M2M service database 331 depicted in FIG. 3, for example, may be realized by the MTC-IWF 901 or the SCS 902.

Here, in the search of an M2M service, since information related to communication quality between devices (for example, latency) is not referenced, the required quality in an actual service may not be satisfied.

Thus, when communication between devices is performed on a mobile communications network, discovery of a required service may be performed based on ProSe discovery results and external (M2M platform, etc.) service information. However, since the quality (delay time, etc.) of the communication link between devices differs according to the path, the required quality of the discovered service may not be satisfied.

For example, concerning competitive games and applications requiring real-time control, in connection methods other than D2D communication, the quality of service (QoS) may not be satisfied. Including the so-called problem of "packet congestion", it is possible to recognize the actual quality of experience (QoE) level in a used service after the start of the service.

These issues are caused by the discovery of services at devices being performed without regard for the quality of the inter-device communication link actually used.

In contrast, the DSF 321 extracts services based on the allowable amounts of delay of services that UEs are able to provide and estimated amounts of delay (latency) of communication in connection paths between UEs and thereby, enables extraction of services for which the estimated amount of delay is the allowable amount of delay or less. As a result, it is possible to provide to a certain device, an M2M service that satisfies a required quality. Here, the user of the certain device is not consciously aware of the information (quality) of the communication link used in inter-device communication, for example, the user of the certain device is always presented with only M2M services that satisfy a required quality.

FIG. 10 is a diagram depicting an example of services corresponding to devices and servers. As depicted in a table 1000 of FIG. 10, devices (for example, the UEs 201 to 207) and servers (for example, the cloud server 251) of the communications system 200 correspond to services a to h. "service numbers" of services a to g are services corresponding to the UEs 201 to 207, respectively. Service h is a service corresponding to the cloud server 251.

Services e, g corresponding to the UEs 205, 207 are services corresponding to a competitive game application. Services a, b, and d corresponding the UEs 201, 202, and 204 are services corresponding to an application of remote control such as radio control.

Services c, f corresponding to the UEs 203, 206 are services corresponding to a peer to peer (P2P) file transfer application. Service h corresponding to the cloud server 251 is a service corresponding to a cloud M2M application.

Figure 11:
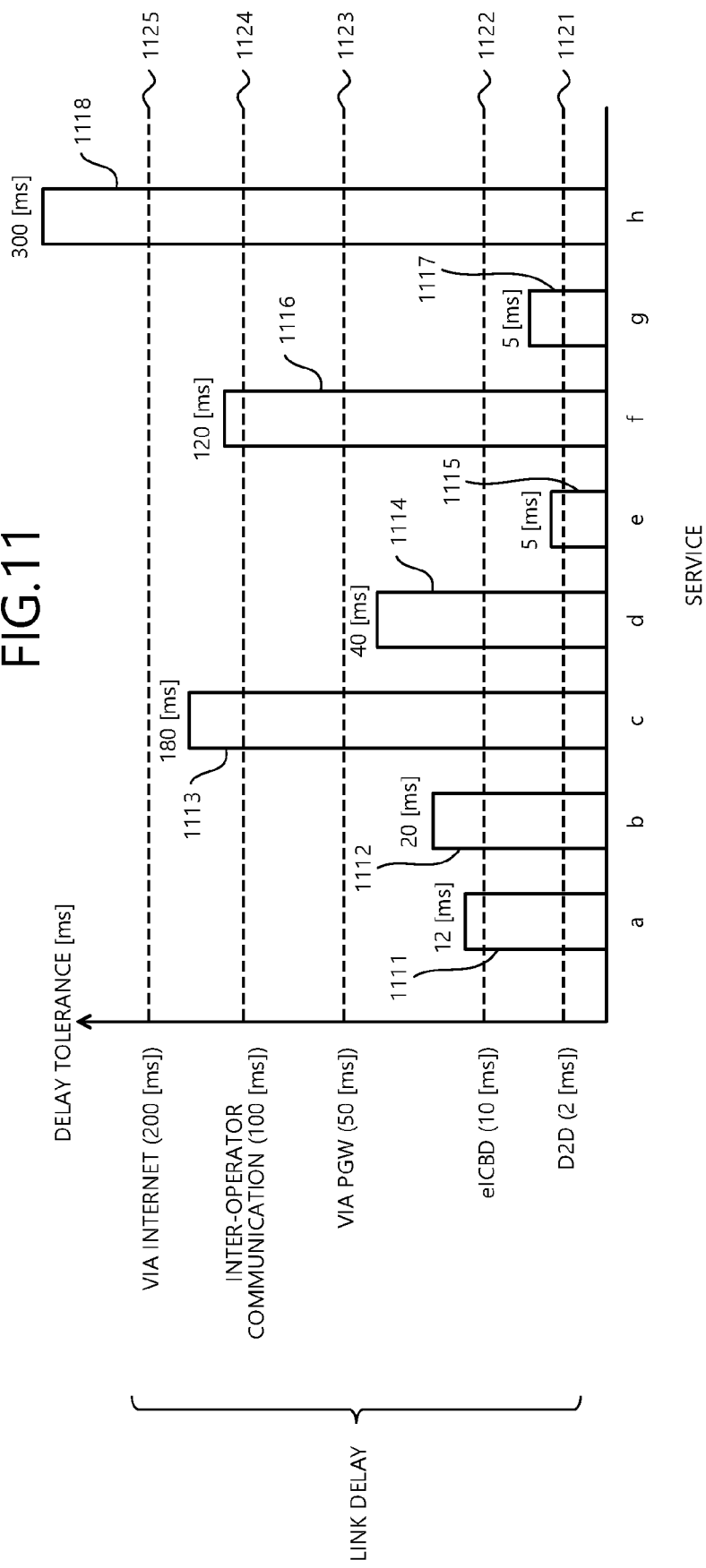
FIG. 11 is a diagram depicting an example of delay tolerance in services and the amount of link delay in paths.

FIG. 11 is a diagram depicting an example of delay tolerance in services and the amount of link delay in paths. In FIG. 11, the vertical axis represents the delay tolerance [ms] of services. The delay tolerance is the maximum link delay allowed in a service, for example. The delay tolerance, for example, decreases with the demand for real-time compatibility.

Delay tolerances 1111 to 1118 represent delay tolerances of services a to h, respectively. Link delays 1121 to 1125 are link delays in "D2D", "eICBD", "via PGW", "inter-operator communication", and "via the Internet", respectively. These connection links, for example, are the links described in FIG. 2B.

For example, "D2D" is a connection link by direct wireless communication between UEs. "eICBD" is a connection link that bypasses a PGW (for example, the PGWs 241, 242) and, for example, passes through a base station (for example, the eNBs 211 to 213). "via PGW" is a connection link that bypasses the PDN 250 and passes through a PGW (for example, the PGWs 241, 242).

"inter-operator communication" is a connection link connecting, via the PDN 250, UEs belonging to different operator networks. "via the Internet" is a connection link connecting a UE and the cloud server 251, via the PDN 250 and by connection to the cloud server 251.

As depicted in FIG. 11, for example, since services e, g are services corresponding to a competitive game application (for example, refer to FIG. 10), the delay tolerance is low (5 [ms]). Therefore, services e, g require a service provided by "D2D" having the small link delay 1121 of (2 [ms]).

Since service h is a service corresponding to a cloud M2M application (for example, refer to FIG. 10), service h has a delay tolerance that is high (300 [ms]). Therefore, service h may be provided a service by "via the Internet" having the large link delay 1125 of (200 [ms]).

FIG. 12 is a diagram depicting an example of information collected by the DSF. A table 1200 depicted in FIG. 12 is aggregate information of service information and ProSe discovery information received by the DSF 321 from UEs, and information obtained from an external database (for example, the M2M service database 331).

In the table 1200, "device/server" is identification information indicating a device or service source of the information. In "device/server" of the table 1200, device A to device G (UEs 201 to 207) and server H (the cloud server 251) are included.

"service" is information indicating a service corresponding to the device or server indicated by "device/server". "service" is information based on service information received by the DSF 321 from the UEs.

"required QoS" is QoS information indicating the allowable amount of delay (delay tolerance in FIG. 11) of the service indicated by "service". "required QoS", for example, may be preset in the DSF 321 according to the type of "service" or may be notified to the DSF 321 by a device or server.

"D2D discovery result" is information indicating a device detected by the device indicated by "device/server", using D2D discovery. "D2D discovery result" is information based on ProSe discovery information received by the DSF 321 from the UEs.

"PLMN ID" is identification information of the PLMN indicating the operator network (carrier) to which the device indicated by "device/server" is connected. "PLMN ID", for example, is notified to the DSF 321 by the UEs. Alternatively, "PLMN ID", for example, may be notified to the DSF 321 by the MME 322.

In place of "PLMN ID", a UETRAN Cell Global Identifier (ECGI) indicating a connection cell or Globally Unique MME Identifier (GUMMEI) indicating a connection MME may be used.

For example, the table 1200 indicates that device A (UE 201) corresponds to service a, and the required QoS (the allowable amount of delay) in service a is 12 [ms]. Further, the table 1200 indicates that a device capable of D2D communication with device A is device B (the UE 202). The table 1200 further indicates that the identification information of the operator network to which device A belongs is "1".

Figure 13A:
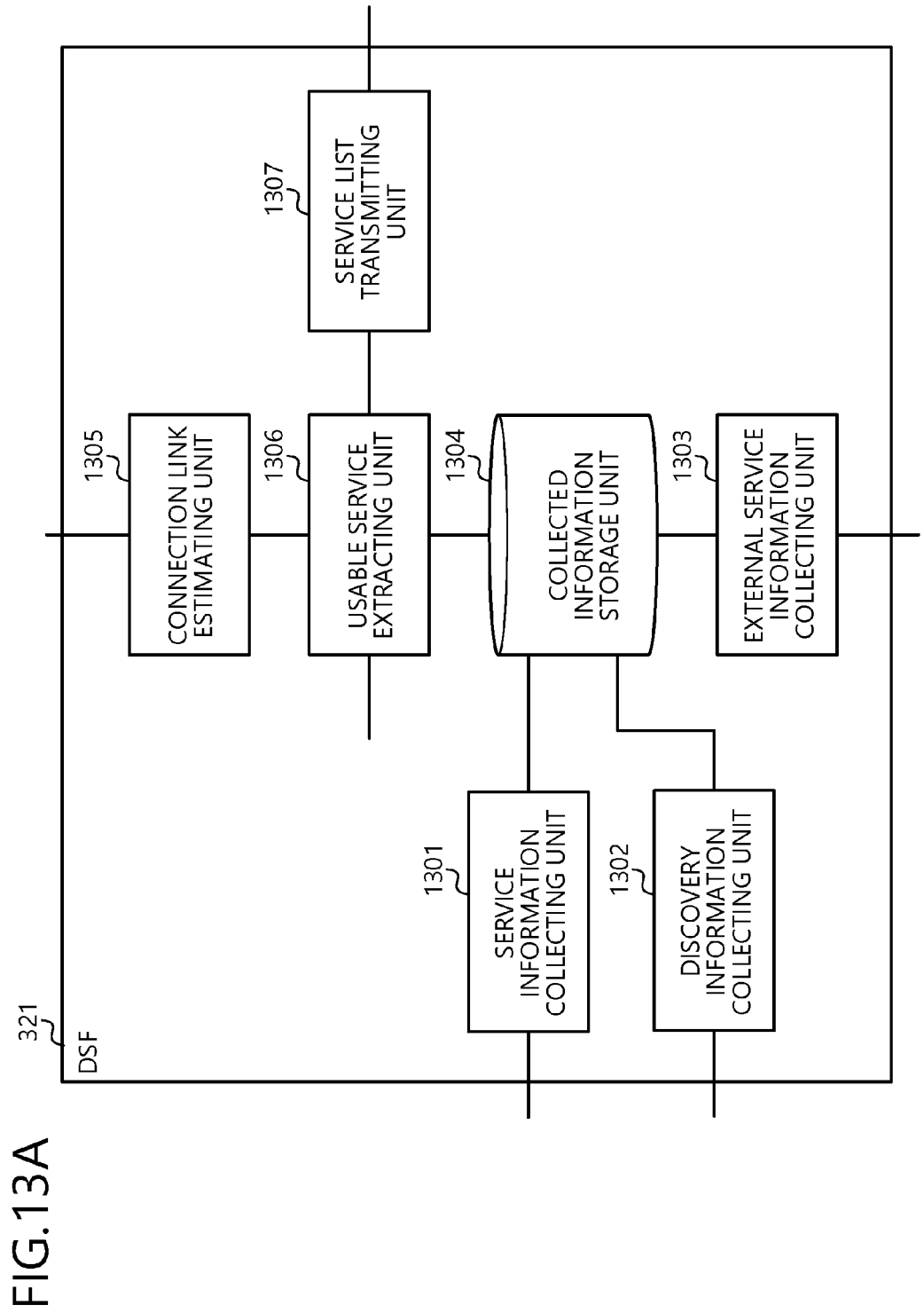
FIG. 13A is a diagram depicting an example of the DSF.
Figure 13B:
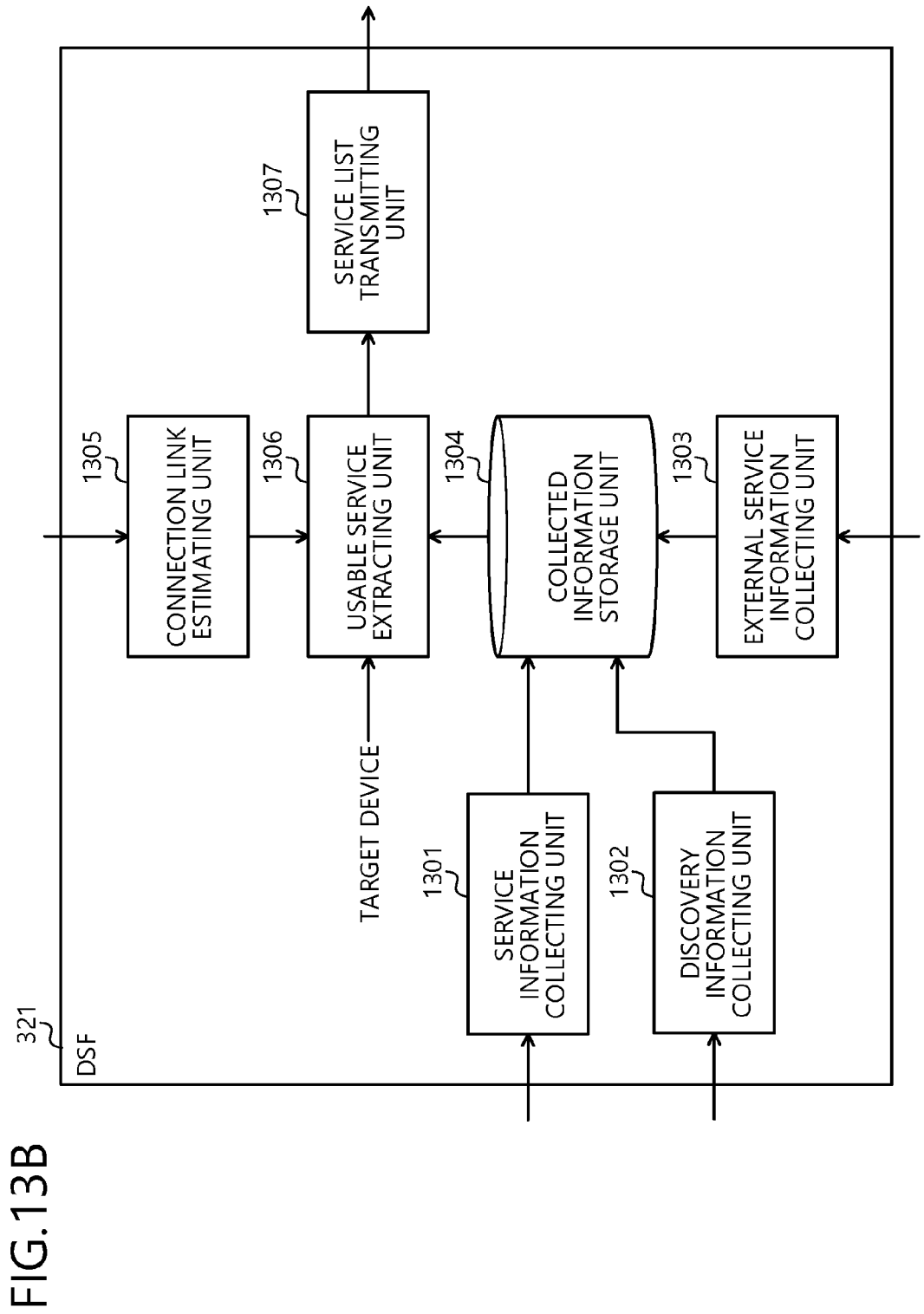
FIG. 13B is a diagram depicting an example of signal flow in the DSF depicted in FIG. 13A.

FIG. 13A is a diagram depicting an example of the DSF. FIG. 13B is a diagram depicting an example of signal flow in the DSF depicted in FIG. 13A. As depicted in FIGS. 13A and 13B, the DSF 321, for example, includes a service information collecting unit 1301, a discovery information collecting unit 1302, an external service information collecting unit 1303, and a collected information storage unit 1304. The DSF 321 further includes a connection link estimating unit 1305, a usable service extracting unit 1306, and a service list transmitting unit 1307.

The service information collecting unit 1301 collects service information transmitted from devices (for example, the UEs 201 to 207), via a base station (for example, the eNBs 211, 213). For example, for devices belonging to the operator network of the DSF 321, the service information collecting unit 1301 receives service information from base stations of the operator network of the DSF 321.

The service information collecting unit 1301 further receives from a ProSe function (for example, refer to FIG. 7) of another operator network different from that of the DSF 321, service information for devices belonging to the other operator network. The service information collecting unit 1301 outputs the collected service information to the collected information storage unit 1304.

The discovery information collecting unit 1302 receives ProSe discovery information transmitted from devices (for example, the UEs 201 to 207), via a base station (for example, the eNBs 211, 213). For example, the discovery information collecting unit 1302 receives from a base station of the operator network of the DFS 321, ProSe discovery information for devices belonging to the operator network of the DFS 321.

The discovery information collecting unit 1302 receives from a ProSe function (for example, refer to FIG. 7) of another operator network different from the operator network of the DFS 321, ProSe discovery information for devices belonging to the other operator network. The discovery information collecting unit 1302 outputs the collected ProSe discovery information to the collected information storage unit 1304.

The external service information collecting unit 1303 collects information related to external services (for example, service h of the cloud server 251) from a database of external services (for example, the M2M service database 331). The external service information collecting unit 1303 outputs the collected information related to external services to the collected information storage unit 1304.

The collected information storage unit 1304 stores aggregated information (for example, the table 1200 depicted in FIG. 12) output from the service information collecting unit 1301, the discovery information collecting unit 1302, and the external service information collecting unit 1303.

The connection link estimating unit 1305, for a combination of devices, obtains network connection information indicating estimated results of connection links enabling connection between devices of the combination. The connection link estimating unit 1305 outputs obtained network connection information to the usable service extracting unit 1306. The connection link estimating unit 1305, for example, receives the network connection information from the MME 322.

Alternatively, the connection link estimating unit 1305 may receive from the MME 322, position registration information indicating tracking areas of the devices. In this case, the connection link estimating unit 1305 may obtain network connection information by estimating for a combination of devices, connection links enabling connection between devices of the combination, based on the received position registration information.

For example, the connection link estimating unit 1305 is able to estimate that devices located in the same tracking area may be connected to each other by "eICBD", "via PGW", and "inter-operator communication" connection links. Further, the connection link estimating unit 1305 is able to estimate that devices located in respectively differing tracking areas may be connected by "via PGW" and "inter-operator communication" connection links.

The usable service extracting unit 1306 regards each device subject to provision of a discovery service function by the DSF 321 as a target device, extracts a service that the target device is able to use, and outputs a service list indicating extraction results to the service list transmitting unit 1307. In the extraction of services that the target device is able to use, the usable service extracting unit 1306 uses the information stored by the collected information storage unit 1304 and the network connection information output from the connection link estimating unit 1305.

The service list transmitting unit 1307 transmits, via the target device, the service list output from the usable service extracting unit 1306. The transmission of the service list to the target device by the service list transmitting unit 1307, for example, is performed via the base station to which the target device (UE) is connected.

The receiving unit 131 depicted in FIGS. 1A and 1B, for example, may be realized by the service information collecting unit 1301 and the discovery information collecting unit 1302. The transmitting unit 132 depicted in FIGS. 1A and 1B, for example, may be realized by the service list transmitting unit 1307.

Figures 13C, 14:
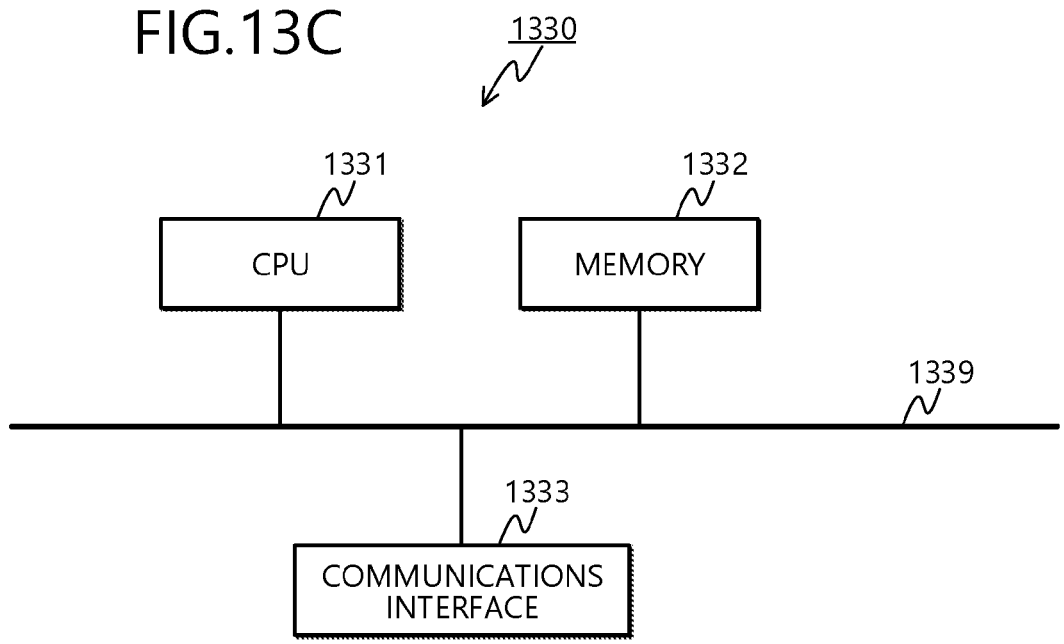
FIG. 13C is a diagram depicting an example of hardware configuration of the DSF.
FIG. 14 is a diagram depicting an example of a service list.

FIG. 13C is a diagram depicting an example of hardware configuration of a DSF. The DSF 321 depicted in FIGS. 13A and 13B, for example, may be realized by a communications apparatus 1330 depicted in FIG. 13C. The communications apparatus 1330 includes a CPU 1331, a memory 1332, and a communications interface 1333. The CPU 1331, the memory 1332, and the communications interface 1333 are connected by a bus 1339.

The CPU (central processing unit) 1331 governs overall control of the communications apparatus 1330. The memory 1332, for example, includes main memory and auxiliary memory. The main memory, for example, is a random access memory (RAM). The main memory is used as a work area of the CPU 1331. The auxiliary memory, for example, is non-volatile memory such as a magnetic disk, an optical disk, flash memory, and the like. The auxiliary memory stores various programs operating the communications apparatus 1330. Programs stored in the auxiliary memory are loaded onto the main memory and executed by the CPU 1331.

The communications interface 1333 is a communications interface that performs wired or wireless communication with an external destination of the communications apparatus 1330 (for example, the eNBs 311, 312, the MME 322, the device service database 323, the M2M service database 331). The communications interface 1333 is controlled by the CPU 1331.

The service information collecting unit 1301, the discovery information collecting unit 1302, the connection link estimating unit 1305, and the service list transmitting unit 1307 depicted in FIGS. 13A and 13B, for example, may be realized by the CPU 1331 and the communications interface 1333. The collected information storage unit 1304 depicted in FIGS. 13A and 13B, for example, may be realized by the memory 1332. The usable service extracting unit 1306 depicted in FIGS. 13A and 13B, for example, may be realized by the CPU 1331 and the memory 1332.

FIG. 14 is a diagram depicting an example of a service list. A service list 1400 depicted in FIG. 14 is the service list depicted in FIGS. 13A and 13B, and transmitted to the UE 201 (device A) by the service list transmitting unit 1307.

The service list 1400 indicates applicable-link limitations according to useable services of the UE 201. An applicable-link limitation, for example, is a connection link (type of connection path) that is usable when a corresponding service is used.

The UE 201 is assumed to request service a. Since service a is remote control, services b and d directly match the request of the UE 201 (refer to FIG. 10). Therefore, services b and d are included in the service list 1400.

Other than services b and d, services c, f, and h are also included in the service list 1400 as services that are able to be provided. As a result, other than the services b and d, the UE 201 may also select services c, f, and h.

A "via the Internet" connection link is a link connecting a UE and the cloud server 251 as described above and therefore, a usable service that is able to use "via the Internet" is limited to service h.

Service b has an allowable amount of delay of 20 [ms] and connection links having a link delay that satisfies this allowable amount of delay are "D2D" and "eICBD" (refer to FIG. 11). Further, the UE 201 (device A) is able to perform D2D communication with the UE 202 (device B) (refer to FIG. 12). Therefore, in the service list 1400, applicable-link limitations corresponding to service b are "D2D" and "eICBD".

Service d has an allowable amount of delay of 40 [ms] and connection links having a link delay that satisfies this allowable amount of delay are "D2D" and "eICBD". However, the UE 201 (device A) is not able to perform D2D communication with the UE 204 (device D). Therefore, in the service list 1400, an applicable-link limitation corresponding to service d is "eICBD".

Services c and f have allowable amounts of delay of 180 [ms] and 120[ms], respectively, and connection links having a link delay that satisfies these allowable amounts of delay are "D2D", "eICBD", "via PGW", and "inter-operator communication". However, the UE 201 (device A) is unable to perform D2D communication with the UEs 203, 206 (devices C, F). Further, the UE 201 is connected to a different base station and operator network than the UE 206. Therefore, in the service list 1400, an applicable-link limitation corresponding to service c is "other than via the Internet, D2D". Further, in the service list 1400, an applicable-link limitation corresponding to service f is "inter-operator communication".

Service h that is "via the Internet" has an allowable amount of delay of 300 [ms] and the link delay of "via the Internet" satisfies this allowable amount of delay (refer to FIG. 11). Therefore, in the service list 1400, an applicable-link limitation corresponding to service h is "via the Internet".

Services e and g each has an allowable amount of delay of 5 [ms] and no connection links have a link delay below this. Therefore, services e and g are not included in the service list 1400. For example, the UE 205 (device E) belongs to a different operator network than the UE 201 (device A) and the allowable amount of delay service e is not satisfied. Further, the UE 207 (device G) belongs to a different operator network than the UE 201 (device A) and the allowable amount of delay of service g is not satisfied.

Figure 15:
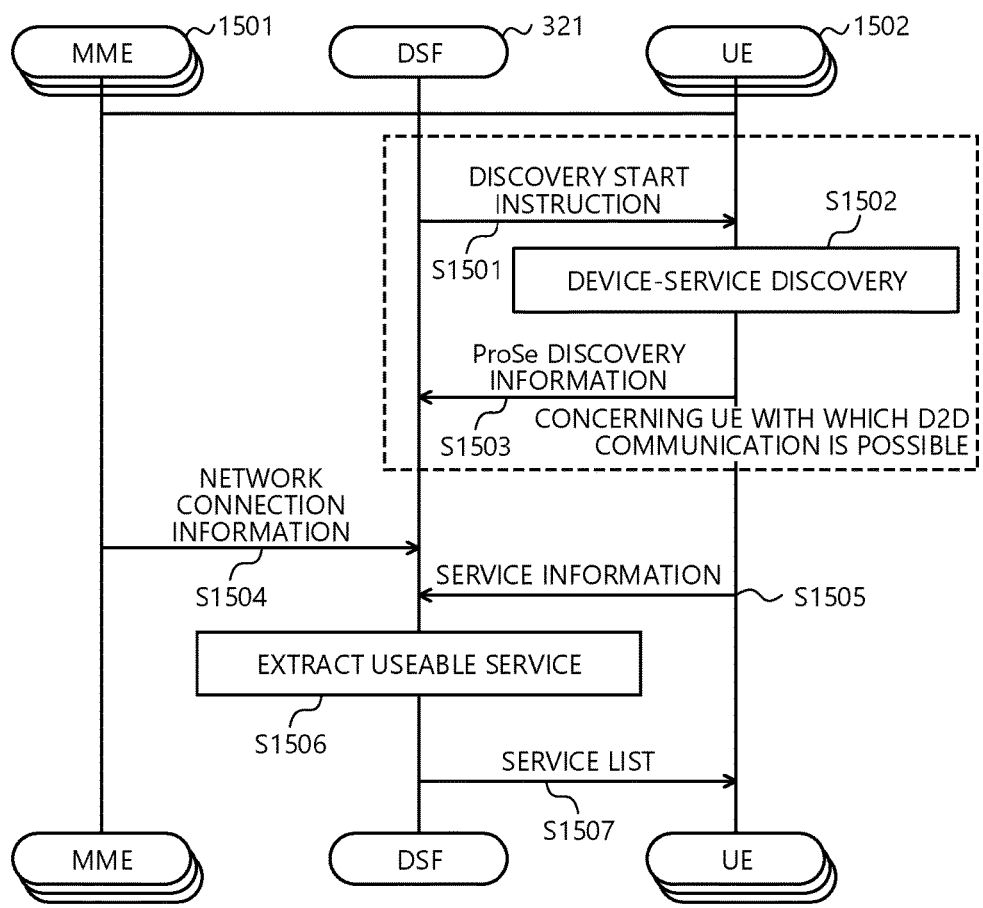
FIG. 15 is a sequence diagram depicting an example of operation in the communications system according to the second embodiment.

FIG. 15 is a sequence diagram depicting an example of operation in the communications system according to the second embodiment. An MME 1501 depicted in FIG. 15, for example, is the MME 322 depicted in FIG. 3. Further, the MME 1501 may be multiple MMES that include the MME 322. A UE 1502, for example, is one or more UEs such as the UEs 301 to 305 depicted in FIG. 3.

The DSF 321 transmits, via a base station, to the one or more UEs 1502, a discovery start instruction instructing the start of ProSe discovery (step S1501). The base station, for example, is the eNB 311 and the eNB 312 depicted in FIG. 3.

The one or more UEs 1502 perform discovery (device-service discovery) of a device and service by exchanging discovery signals (step S1502). As the discovery signal, for example, the discovery message 610 depicted in FIG. 6A or the discovery message 620 depicted in FIG. 6B may be used.

The one or more UEs 1502 transmit to the DSF 321, ProSe discovery information indicating results of the discovery at step S1502 (step S1503). The ProSe discovery information, for example, includes the identification information of a UE with which the UE 1502 is able to directly communicate. The ProSe discovery information may further include information indicating services corresponding to the UE with which the UE 1502 is able to directly communicate.

When the one or more UEs 1502 includes a UE incapable of D2D communication, steps S1501 to S1503, for example, the D2D communication among the UEs 1502 is performed only with respect to capable UEs.

The DSF 321 receives from the MME 1501, network connection information indicating connection links enabling connection of the UEs (step S1504). The DSF 321 may receive from the MME 1501, position registration information indicating tracking areas of the UEs and by judgement based on the received position registration information, may obtain the network connection information. Each UE 1502 transmits service information indicating services corresponding thereto to the DSF 321, via the base station (step S1505).

The sequence of steps S1501 to S1503, step S1504, and step S1505 may be interchanged.

The DSF 321 extracts a useable service for a target device among the one or more UEs 1502, based on the information received at steps S1503 to S1505 (step S1506). The DSF 321 transmits a service list indicating the services extracted at step S1506 to the target UE among the one or more UEs 1502 (step S1507).

The target device, for example, may be at least one UE among the one or more UEs 1502. Alternatively, the target device may be a UE different from the one or more UEs 1502, or may be a UE that has not collected ProSe discovery information and/or service information.

Figure 16:
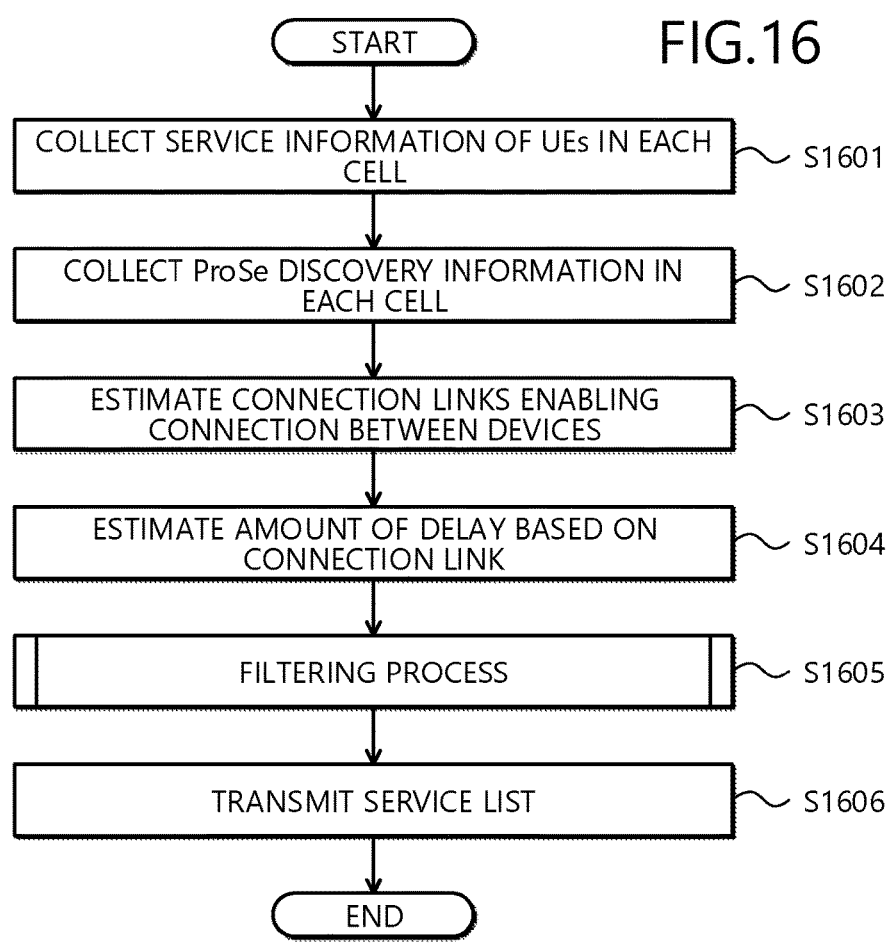
FIG. 16 is a flowchart depicting an example of processing by the DSF.

FIG. 16 is a flowchart depicting an example of processing by the DSF. The DSF 321, for example, executes the steps depicted in FIG. 16. The DSF 321 collects service information of UEs in each cell (step S1601). The service information, for example, includes services (application types) corresponding to the UEs and the allowable amounts of delay of the services.

The DSF 321 collects ProSe discovery information in each cell (step S1602). The ProSe discovery information, for example, includes combinations of devices capable of direct communication and information indicating services (applications) that are usable in direct communication.

The DSF 321, for each combination of the target device, estimates connection links enabling connection between the devices (step S1603). For example, the DSF 321 estimates connection links that enable connection between the devices, based on the networks to which the devices are connected, cell numbers, ProSe discovery information, position information, etc. The DSF 321, at step S1603, may receive from the MME 322, etc., network connection information indicating connection links that enable connection between the devices.

The DSF 321, for each combination of the target device, estimates the amount of delay of each connection link estimated at step S1603 (step S1604). At step S1604, the DSF 321, for example, is able to estimate the amount of delay based on information indicating the amount of delay (for example, refer to FIG. 11) according to connection link.

The DSF 321 performs a filtering process of extracting a usable service for each target device (UE), based on collection results at steps S1601, S1602 and estimated results at steps S1603, S1604 (step S1605). By the filtering process at step S1605, a service list indicating usable services is obtained for each target device. The filtering process at step S1605 will be described hereinafter (for example, refer to FIG. 17).

The DSF 321 transmits the service list obtained for each target device by the filtering process at step S1605 to the respective devices (UEs) (step S1606).

Figure 17:
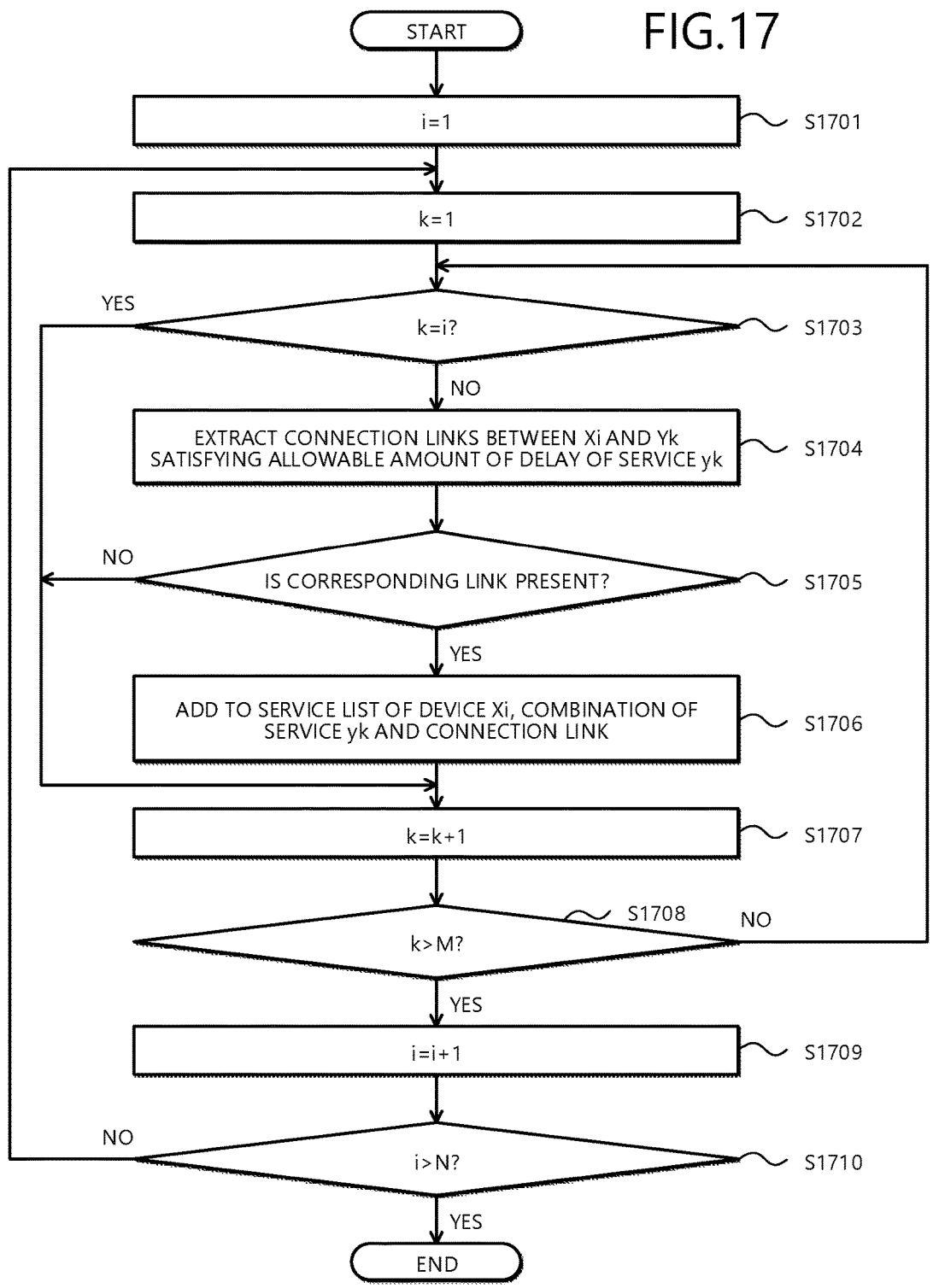
FIG. 17 is a flowchart depicting one example of a filtering process.

FIG. 17 is a flowchart depicting one example of the filtering process. The DSF 321, for example, executes the steps depicted in FIG. 17, for example, as the filtering process at step S1605 depicted in FIG. 16, and thereby creates a service list for each UE.

The DSF 321 initializes an index i (i=1) of a device Xi targeted for service list creation (step S1701). Here, the DSF 321, for example, initializes (for example, clears) the service list of the device Xi. The device Xi targeted for service list creation, for example, is a UE such as the UEs 301 to 305 depicted in FIG. 3.

Next, the DSF 321 initializes (k=1) an index k of a device Yk, which is a connection destination candidate of the device Xi (step S1702). The DSF 321 determines whether index k is equal to index i (step S1703). When index k is equal to index i (step S1703: YES), the DSF 321 transitions to step S1707.

At step S1703, when index k is not equal to index i (step S1703: NO), the DSF 321 transitions to step S1704. In other words, the DSF 321, from among connection links configurable between the devices Xi, Yk (between Xi and Yk estimated at step S1603 in FIG. 16, extracts connection links that satisfy the allowable amount of delay of a service yk that corresponds to the device Yk (step S1704). A connection link that satisfies the allowable amount of delay, for example, is a connection link for which the amount of delay is the allowable amount of delay or less.

The extraction at step S1704, for example, may be performed based on information indicating the allowable amount of delay of the service yk, the device Xi estimated at step S1604 depicted in FIG. 16, and the amounts of delay in the connection links with the device Yk.

The DSF 321 determines based on extraction results at step S1704, whether a connection link (corresponding link) satisfying the allowable amount of delay is present between the device Xi and the device Yk (step S1705). When no corresponding link is present (step S1705: NO), the DSF 321 determines that the device Xi is unable to use the service of the device Yk and transitions to step S1707.

At step S1705, when a corresponding link is present (step S1705: YES), the DSF 321 transitions to step S1706. In other words, the DSF 321 adds to the service list of the device Xi, a combination of the service yk and the connection link extracted at step S1704 (step S1706).

The DSF 321 increments index k (+1) (step S1707). The DSF 321 determines whether index k exceeds M (step S1708). M is a maximum value of index k and a value corresponding to the number of devices registered by the DSF 321.

At step S1708, when index k does not exceed M (step S1708: NO), the DSF 321 returns to step S1703. When index k exceeds M (step S1708: YES), the DSF 321 increments index i (step S1709). After step S1709, the DSF 321, for example, initializes the service list of the device Xi.

Next, the DSF 321 determines whether index i exceeds N (step S1710). N is a maximum value of index i and is a value corresponding to the number of devices registered by the DSF 321. When index i does not exceed N (step S1710: NO), the DSF 321 returns to step S1702. When index i exceeds N (step S1710: YES), the DSF 321 ends a series processes. As a result, a service list may be obtained for each device Xi.

FIG. 18 is a diagram depicting an example of filtering results for each device. A table 1800 in FIG. 18 depicts one example of service and applicable-link limitations presented to the UEs 201 to 207 (devices A to G) by a service list.

"device" in the table 1800 corresponds to "device/server" in the table 1200 depicted in FIG. 12. "service", "allowable amount of delay", "D2D discovery result", and "PLMN ID" in the table 1800 correspond to "service", "allowable amount of delay", "D2D discovery result", and "PLMN ID", respectively, in the table 1200 depicted in FIG. 12.

"presented candidate service" in the table 1800 is a candidate service (service a to h) presented to the UEs 201 to 207 and an applicable-link limitation of the presented candidate service. "x" in "presented candidate service" indicates that the concerned service cannot be used.

As depicted in the table 1800, for example, in the service list transmitted to the UE 201 (device A), services b, c, d, f, and h are presented as usable services (similarly in FIG. 14). Further, applicable-link limitations of services b, c, d, f, and h are "D2D, eICBD", "D2D, other than via the Internet", "eICBD", "inter-operator communication", "via the Internet", respectively.

Further, for example, in the service list transmitted to the UE 204 (device D), services a, b, c, f, and h are presented as usable services. Further, the UE 204 is able to perform D2D communication with the UE 203 (device C) (for example, refer to FIG. 12) and therefore, when the UE 204 uses service c of the UE 203, D2D communication is usable. Therefore, applicable-link limitations of services a, b, c, f, and h are "eICBD", "eICBD", "other than via the Internet", "inter-operator communication", and "via the Internet", respectively.

FIG. 19A is a diagram depicting an example of a UE. FIG. 19B is a diagram depicting an example of signal flow in the UE depicted in FIG. 19A. The UEs 201 to 207 and the UEs 301 to 305 may each, for example, be realized by a UE 1910 depicted in FIGS. 19A and 19B. The UE 1910 includes a service information transmitting unit 1911, a discovery executing unit 1912, a discovery information transmitting unit 1913, a service list receiving unit 1914, a control unit 1915, and a communication executing unit 1916.

The service information transmitting unit 1911, under the control of the control unit 1915, transmits to the DSF 321, via a base station to which the UE 1910 is connected, service information that indicates services corresponding to the UE 1910 (thereof).

The discovery executing unit 1912, under the control of the control unit 1915, executes by an exchange of discovery signals, ProSe discovery of detecting a device (UE) with which direct communication with the UE 1910 is possible. The discovery executing unit 1912 outputs to the control unit 1915, ProSe discovery information indicating devices and services detected by the ProSe discovery.

The discovery information transmitting unit 1913, under the control of the control unit 1915, transmits to the DSF 321, via the base station to which the UE 1910 is connected, the ProSe discovery information obtained by the discovery executing unit 1912.

The service list receiving unit 1914 receives a service list transmitted from the DSF 321, via the base station to which the UE 1910 is connected. The service list receiving unit 1914 outputs the received service list to the control unit 1915.

The control unit 1915 performs control of the service information transmitting unit 1911, the discovery executing unit 1912, the discovery information transmitting unit 1913, the service list receiving unit 1914, and the communication executing unit 1916. For example, the control unit 1915 performs control of causing the service information transmitting unit 1911 to transmit service information.

The control unit 1915 further performs control of causing the discovery executing unit 1912 to execute ProSe discovery. The control unit 1915 further performs control of causing ProSe discovery information obtained by the ProSe discovery of the discovery executing unit 1912 to be transmitted by the discovery information transmitting unit 1913. The control unit 1915 further performs control of causing the communication executing unit 1916 to execute communication based on the service list output from the service list receiving unit 1914.

The communication executing unit 1916, under the control of the control unit 1915, executes inter-device communication between the UE 1910 and another device. For example, the communication executing unit 1916 presents the service list received by the service list receiving unit 1914 to the user of the UE 1910 and receives from the user, specification of a service to be executed by the communication executing unit 1916 among the services indicated in the service list. The communication executing unit 1916 executes inter-device communication of the service received from the user.

Alternatively, the communication executing unit 1916 may automatically select from among the services indicated in the service list, a service to be executed by the communication executing unit 1916 and execute inter-device communication of the selected service. In this case, the communication executing unit 1916 may automatically select a service according to connection links that may be used by each service, based on applicable-link limitations included in the service list. For example, the communication executing unit 1916 may preferentially select a service that is able to use D2D communication. As a result, a service of direct communication and for which delay is minimal may be preferentially selected.

The communication executing unit 1916, for each service of the service list, may present to the user, a magnitude of the amount of delay corresponding to the applicable-link limitation. As a result, the user is able to consider the magnitude of the amount of delay in selecting a service. Further, the communication executing unit 1916 may present to the user, the magnitude of an overall amount of delay of the services included in the service list, based on applicable-link limitations of the services included in the service list. For example, the communication executing unit 1916 may present to the user, the magnitude of the smallest amount of delay among amounts of delay of connection links included in the applicable-link limitations of the services.

The communication executing unit 1916 may preferentially present to the user, a service that is able to use D2D communication. As a result, a service of direct communication and for which delay is minimal may be preferentially presented to the user.

The communication executing unit 1916 executes communication with the cloud server 251 included in the service list.

For example, when a service included in the service list is performed by D2D communication, the communication executing unit 1916 performs D2D communication with the device indicated in the service list. Further, when a service included in the service list is performed by a connection link other than D2D, the communication executing unit 1916 requests the service from the DSF 321 and under the control of the DSF 321, performs communication related to the service.

The transmitting unit 121 depicted in FIGS. 1A and 1B, for example, may be realized by the service information transmitting unit 1911 and the discovery information transmitting unit 1913. The receiving unit 111 depicted in FIGS. 1A and 1B, for example, may be realized by the service list receiving unit 1914.

Figure 19C:
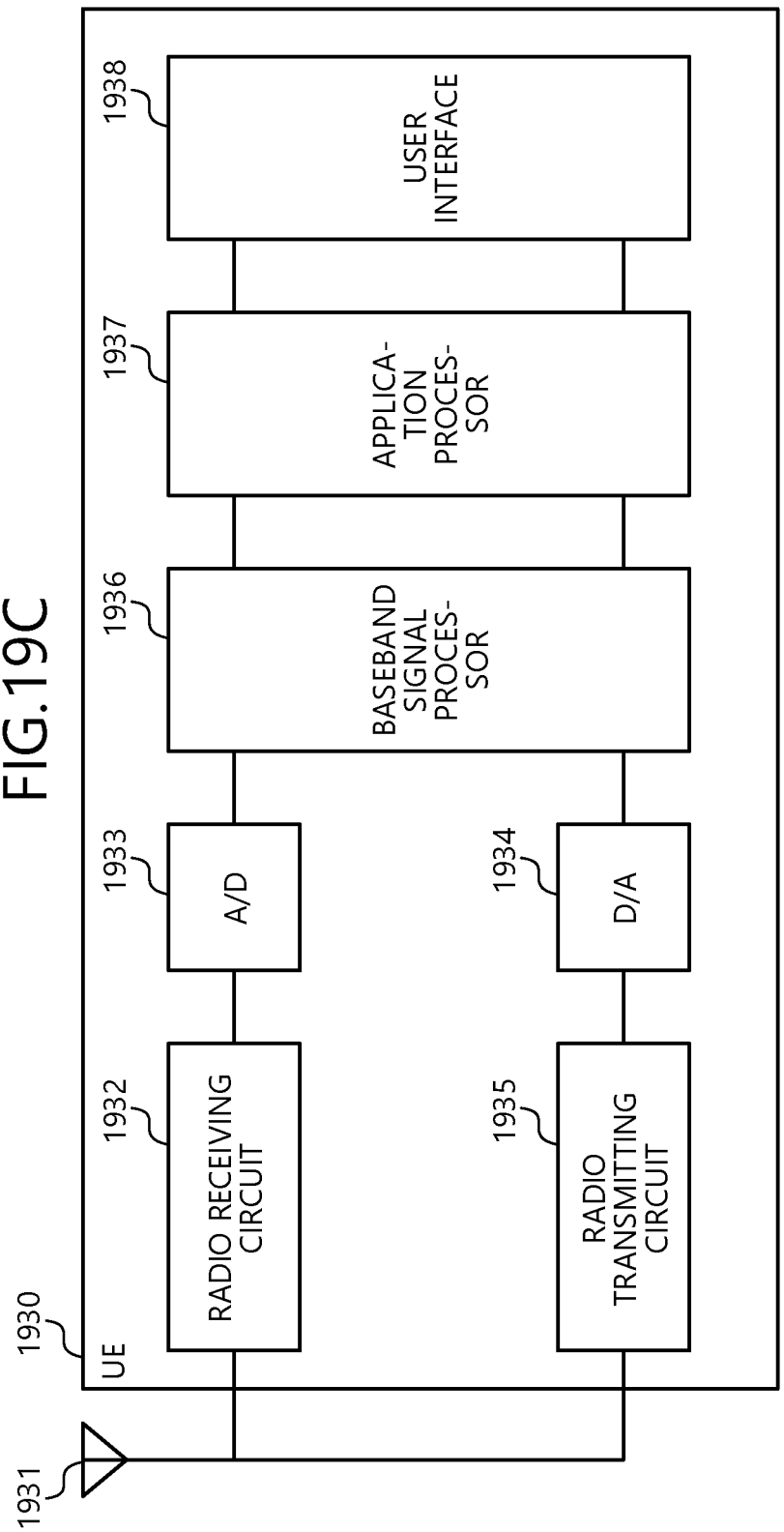
FIG. 19C is a diagram depicting an example of hardware configuration of a UE.

FIG. 19C is a diagram depicting an example of hardware configuration of a UE. FIG. 19D is a diagram depicting an example of signal flow in the UE depicted in FIG. 19C. The UE 1910 depicted in FIGS. 19A and 19B, for example, may be realized by a UE 1930 depicted in FIGS. 19C and 19D. The UE 1930 includes an antenna 1931, a radio receiving circuit 1932, a digital converter 1933 (A/D), an analog converter 1934 (D/A), and a radio transmitting circuit 1935. The UE 1930 further includes a baseband signal processor 1936, an application processor 1937, and a user interface 1938.

The antenna 1931 receives a signal wirelessly transmitted from another communications apparatus (for example, a base station or another UE) and outputs the received signal to the radio receiving circuit 1932. The antenna 1931 further wirelessly transmits a signal output from the radio transmitting circuit 1935.

The radio receiving circuit 1932 performs a radio reception process of the signal output from the antenna 1931. The radio reception process by the radio receiving circuit 1932, for example, includes amplification processing and frequency conversion processing of conversion from a high frequency bandwidth to a baseband width. The radio receiving circuit 1932 outputs the radio reception processed signal to the digital converter 1933.

The digital converter 1933 converts the signal output from the radio receiving circuit 1932 into a digital signal from an analog signal. The digital converter 1933 outputs the digitally converted signal to the baseband signal processor 1936.

The analog converter 1934 converts a signal output from the baseband signal processor 1936 into an analog signal from a digital signal. The analog converter 1934 outputs the analog converted signal to the radio transmitting circuit 1935.

The radio transmitting circuit 1935 performs a radio transmission process of the signal output from the analog converter 1934. The radio transmission process by the radio transmitting circuit 1935, for example, includes amplification processing and frequency conversion processing of conversion from a baseband width to a high frequency bandwidth. The radio transmitting circuit 1935 outputs the radio transmission processed signal to the antenna 1931.

The baseband signal processor 1936 performs a baseband reception process of the signal output from the digital converter 1933. The baseband reception process by the baseband signal processor 1936, for example, includes various types of processing such as demodulation and decoding.

The baseband signal processor 1936 outputs data obtained by the baseband reception process to the application processor 1937.

The baseband signal processor 1936 performs a baseband transmission process of the data output from the application processor 1937. The baseband transmission process by the baseband signal processor 1936, for example, includes various types of processing such as encoding and modulation. The baseband signal processor 1936 outputs to the analog converter 1934, a signal obtained by the baseband transmission process.

The application processor 1937 is a processing unit that executes an application in the UE 1930. The application in the UE 1930 includes an application that performs communication by controlling the baseband signal processor 1936.

The user interface 1938, for example, includes an input device that receives operation input from the user and an output device that outputs information to the user. The input device, for example, may be realized by keys (for example, a keyboard), a remote controller, or the like. The output device, for example, may be realized by a display, a speaker, or the like. Further, the input device and the output device may be realized by a touch panel. The user interface 1938 is controlled by the application processor 1937.

The service information transmitting unit 1911 depicted in FIGS. 19A and 19B, for example, may be realized by the antenna 1931, the analog converter 1934, the radio transmitting circuit 1935, and the baseband signal processor 1936. The discovery executing unit 1912, for example, may be realized by the antenna 1931, the radio receiving circuit 1932, the digital converter 1933, the analog converter 1934, the radio transmitting circuit 1935, and the baseband signal processor 1936.

The discovery information transmitting unit 1913, for example, may be realized by the antenna 1931, the analog converter 1934, the radio transmitting circuit 1935, and the baseband signal processor 1936. The service list receiving unit 1914, for example, may be realized by the antenna 1931, the radio receiving circuit 1932, the digital converter 1933, and the baseband signal processor 1936.

The control unit 1915, for example, may be realized by the application processor 1937. The communication executing unit 1916, for example, may be realized by the antenna 1931, the radio receiving circuit 1932, the digital converter 1933, the analog converter 1934, the radio transmitting circuit 1935, and the baseband signal processor 1936.

The user interface 1938 may be used to realize the communication executing unit 1916. In this case, the presentation of the service list to the user and receipt of specification of a service from the user may be performed through the user interface 1938.

Thus, according to the second embodiment, the DSF 321 on the network side uses service information collected from the UEs and is able to notify the UEs of usable services. As a result, in the discovery of a communication destination of inter-device communication, wide range discovery not limited to terminals capable of direct communication becomes possible.

As described, according to the communications system, the communications method, and the mobile terminal, discovery with respect to devices of a wide range becomes possible.

For example, according to the embodiments above, a mechanism of sharing in a radio access network (RAN) (between cells), D2D discovery information that the discovery service function has may be built. As a result, device discovery with respect to (D2D) devices in the RAN overall may be realized.

Further, service information of a device other than a D2D device may also be shared in the RAN (between cells). As a result, expansion of discovery targeted devices is enabled.

Further, a mechanism of sharing in a RAN (between cells), various types of service information provided on a network such as the Internet in addition to the D2D discovery information described may be built. As a result, network service discovery may be realized by a mechanism integrating D2D device discovery.

Further, filtering by a matching of a condition of a service request condition and communication link quality is enabled. As a result, from among the described information related an enormous amount of services, discovery of a service actually satisfying QoS may be realized.

Thus, in inter-device communication and discovery of various services provided by a cloud, a comprehensive service database including ProSe devices and a filtering function by the matching of a condition of a service request condition and communication link quality may be provided. As a result, efficient service discovery may be realized.

However, with the traditional techniques above, when communication between devices is performed, since device and service discovery are performed by exchanges of wireless signals between devices, communication destinations of the communication between the devices is limited to devices within a narrow range.

According to one aspect of the present invention, an effect is achieved in that discovery with respect to devices of a wide range becomes possible.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications system comprising:
   a first mobile terminal;
   a second mobile terminal that includes one or more mobile terminals in a state of being unable to directly communicate with the first mobile terminal and that transmits to a network, via a base station, service information indicating communications services that the second mobile terminal is able to provide in inter-terminal communication; and
   a communications apparatus that is provided on the network and that transmits to the first mobile terminal, a list indicating a communications service that the first mobile terminal is able to use, among the communications services indicated by the service information transmitted by the second mobile terminal, wherein the list includes information indicating a type of connection path that is usable when the first mobile terminal uses the communications service in the list.

2. The communications system according to claim 1, wherein
   a service that is able to be provided in the inter-terminal communication is a service that is able to be provided by direct communication between terminals and is a service that is able to be provided by communication between terminals via the network.

3. The communications system according to claim 1, wherein
the second mobile terminal includes mobile terminals belonging to differing telecommunications carriers.

4. The communications system according to claim 1, wherein
the communications apparatus obtains server information indicating communications services that are able to be provided to a mobile terminal, via a base station, by a server connected to the network and the communications apparatus transmits to the first mobile terminal, information related to the communications service that the first mobile terminal is able to use among a service indicated by the obtained server information and a service indicated by the service information.

5. The communications system according to claim 1, wherein
the second mobile terminal transmits to the network, via the base station, detection information indicating a service that is able to be provided by a mobile terminal able to directly communicate with the second mobile terminal and detected by the second mobile terminal using a detection-use signal, and
the communications apparatus transmits to the first mobile terminal, information related to the communications service that the first mobile terminal is able to use among a service indicated by the service information and a service indicated by the detection information transmitted by the second mobile terminal.

6. A communications system comprising:
a first mobile terminal;
a second mobile terminal that includes one or more mobile terminals in a state of being unable to directly communicate with the first mobile terminal and that transmits to a network, via a base station, service information indicating communications services that the second mobile terminal is able to provide in inter-terminal communication; and
a communications apparatus that is provided on the network and that transmits to the first mobile terminal, information related to a communications service that the first mobile terminal is able to use, among the communications services indicated by the service information transmitted by the second mobile terminal, wherein
the communications apparatus transmits to the first mobile terminal, the information related to the communications service that is able to be used and that is extracted based on allowable amounts of delay of the communications services that the second mobile terminal is able to provide and estimated amounts of delay of communication in connection paths between the first mobile terminal and the second mobile terminal.

7. The communications system according to claim 6, wherein
the service information includes information indicating the allowable amounts of delay of the communications services that the second mobile terminal is able to provide in inter-terminal communication.

8. The communications system according to claim 6, wherein
the communications apparatus obtains the estimated amounts of delay, based on information that indicates, corresponding to connection destinations of the first mobile terminal and the second mobile terminal, types of connection paths between the first mobile terminal and the second mobile terminal.

9. The communications system according to claim 6, wherein
the communications apparatus obtains the estimated amounts of delay, based on information indicating whether direct communication between the first mobile terminal and the second mobile terminal is possible.

10. A communications method comprising:
transmitting to a network, via a base station, service information indicating communications services that a second mobile terminal is able to provide in inter-terminal communication, the service information being transmitted by the second mobile terminal that includes one or more mobile terminals in a state of being unable to directly communicate with a first mobile terminal; and
transmitting to the first mobile terminal, a list indicating a communications service that the first mobile terminal is able to use among the communications services indicated by the service information transmitted by the second mobile terminal, the list being transmitted by a communications apparatus provided on the network, wherein the list includes information indicating a type of connection path that is usable when the first mobile terminal uses the communications service in the list.

11. A communications apparatus comprising:
a memory; and
a processor coupled to the memory and configured to:
receive, via a base station, service information that indicates communications services that a second mobile terminal is able to provide in inter-terminal communication, the service information being received from the second mobile terminal that includes one or more mobile terminals in a state of being unable to directly communicate with a first mobile terminal; and
transmit to the first mobile terminal, a list indicating a communications service that the first mobile terminal is able to use, among the communications services indicated by the service information received, wherein the list includes information indicating a type of connection path that is usable when the first mobile terminal uses the communications service in the list.

12. A mobile terminal comprising:
a transmitting circuit that transmits, via a base station, to a communications apparatus of a network, service information indicating communications services that the mobile terminal is able to provide in inter-terminal communication and detection information indicating a service that another mobile terminal is able to provide, wherein the another mobile terminal is able to directly communicate with the mobile terminal and is detected by the mobile terminal using a detection signal;
a receiving circuit that receives a list indicating a communications service that the another mobile terminal is able to use, among the communications services indicated by the service information; and
a control circuit that controls communications based on the list, wherein the list includes information indicating a type of connection path that is usable when the another mobile terminal uses the communications service in the list.

* * * * *